(12) United States Patent
Xiu et al.

(10) Patent No.: US 11,212,496 B2
(45) Date of Patent: Dec. 28, 2021

(54) GEOMETRY CONVERSION AND FRAME PACKING ASSOCIATED WITH 360-DEGREE VIDEOS

(71) Applicant: VID SCALE, INC., Wilmington, DE (US)

(72) Inventors: Xiaoyu Xiu, San Diego, CA (US); Yuwen He, San Diego, CA (US); Yan Ye, San Diego, CA (US); Philippe Hanhart, San Diego, CA (US)

(73) Assignee: VID SCALE, Inc., Wilmington, DE (US)

( * ) Notice: Subject to any disclaimer, the term of this patent is extended or adjusted under 35 U.S.C. 154(b) by 1 day.

(21) Appl. No.: 16/339,516

(22) PCT Filed: Oct. 6, 2017

(86) PCT No.: PCT/US2017/055569
§ 371 (c)(1),
(2) Date: Apr. 4, 2019

(87) PCT Pub. No.: WO2018/067952
PCT Pub. Date: Apr. 12, 2018

(65) Prior Publication Data
US 2019/0238811 A1 Aug. 1, 2019

Related U.S. Application Data

(60) Provisional application No. 62/405,765, filed on Oct. 7, 2016.

(51) Int. Cl.
*H04N 9/31* (2006.01)
*G06T 3/00* (2006.01)
(Continued)

(52) U.S. Cl.
CPC ......... *H04N 9/3185* (2013.01); *G06T 3/0087* (2013.01); *G06T 3/60* (2013.01);
(Continued)

(58) Field of Classification Search
CPC ........ H04N 9/3185; H04N 19/46; H04N 9/78; G06T 3/0087; G06T 3/60; G06T 15/10
See application file for complete search history.

(56) References Cited

U.S. PATENT DOCUMENTS 6,754,400 B2    6/2004  Florin et al.
8,896,601 B1   11/2014  Norman
(Continued)

FOREIGN PATENT DOCUMENTS

JP    H11-18007 A    1/1999

OTHER PUBLICATIONS

Abbas, Adeel, "GoPro Test Sequences for Virtual Reality Video Coding", JVET-C0021, Go Pro, Joint Video Exploration Team (JVET) of ITU-T SG 16 WP 3 and ISO/IEC JTC 1/SC 29/WG 11, 3rd Meeting: Geneva, CH, May 26-31, 2016, 10 pages.
(Continued)

*Primary Examiner* — Sunghyoun Park
(74) *Attorney, Agent, or Firm* — Condo Roccia Koptiw LLP

(57) ABSTRACT

Conversion between different projection formats of a 360-degree video may be performed in a uniform way. The geometric characteristics of the different projection formats may be considered when applying 3D-to-2D and 2D-to-3D mapping. Parameters reflective of the geometric characteristics of the different projection formats may be determined and used in the mapping and/or conversion. The parameters may include a normal vector that is perpendicular to a projection plane, a reference point in the projection plane, and/or unit vectors defined in the projection plane. An
(Continued)

architecture with consolidated modules for handling the various projection formats may be provided.

20 Claims, 28 Drawing Sheets

(51) Int. Cl.
    *H04N 19/46*     (2014.01)
    *H04N 9/78*     (2006.01)
    *G06T 3/60*     (2006.01)
    *G06T 15/10*     (2011.01)

(52) U.S. Cl.
    CPC .............. *G06T 15/10* (2013.01); *H04N 9/78* (2013.01); *H04N 19/46* (2014.11)

(56) References Cited

U.S. PATENT DOCUMENTS

| | | | |
|---|---|---|---|
| 2004/0041817 A1* | 3/2004 | Hunter | G06T 15/04 345/611 |
| 2004/0076340 A1* | 4/2004 | Nielsen | G06T 3/0062 382/284 |
| 2004/0105597 A1 | 6/2004 | Lelescu et al. | |
| 2006/0013302 A1* | 1/2006 | Bao | H04N 19/30 375/240.08 |
| 2010/0104221 A1* | 4/2010 | Yeung | G06T 3/60 382/297 |
| 2012/0098926 A1 | 4/2012 | Kweon | |
| 2013/0057567 A1* | 3/2013 | Frank | G06F 3/1454 345/589 |
| 2016/0142697 A1* | 5/2016 | Budagavi | H04N 19/117 348/43 |
| 2016/0366444 A1* | 12/2016 | Sullivan | H04N 19/186 |
| 2017/0251204 A1* | 8/2017 | Gupte | H04N 19/154 |

OTHER PUBLICATIONS

Bang, et al., "Description of 360 3D Video Application Exploration Experiments on Divergent Multi-View Video", ISO/IEC JTC1/SC29/WG11 MPEG2015/ M16129, San Diego, CA, US, Feb. 2016, 5 pages.

Choi, Byeongdoo, "Technologies Under Consideration for Omnidirectional Media Application Format", Systems Subgroup, ISO/IEC JTC1/SC29/WG11 N15946, San Diego, CA, US, Feb. 2016, 16 pages.

Engelhardt et al., "Octahedron Environment Maps", Visualization Research Center, University of Stuttgart, Jan. 2008, 6 pages.

Facebook, "Facebook 360 Video", Available at https://facebook360.fb.com/, Retrieved on Apr. 4, 2019, pp. 1-5.

Facebook, "Next-Generation Video Encoding Techniques for 360 Video and VR", Available at https://code.facebook.com/posts/1126354007399553/next-generation-video-encoding-techniques-for-360-video-and-vr/, Jan. 21, 2016, pp. 1-6.

Github, "Facebook's Equirectangular to Cube Map Tool on GitHub", Available at https://github.com/facebook/transform?files=1, retrieved on Nov. 9, 2018, pp. 1-3.

Google, "Google Cardboard", Available at https://www.google.com/get/cardboard/, retrieved on Nov. 9, 2018, pp. 1-4.

He et al., "AHG8: Algorithm Description of InterDigital's Projection Format Conversion Tool (PCT360)", JVET-D0090, InterDigital Communications Inc.,Joint Video Exploration Team (JVET) of ITU-T SG 16 WP 3 and ISO/IEC JTC 1/SC 29/WG 11, 4th Meeting: Chengdu, CN, Oct. 15-21, 2016, pp. 1-6.

He et al., "AHG8: Algorithm Description of Projection Format Conversion in 360Lib", JVET-E0084, InterDigital Communications Inc., Samsung Electronics Co. Ltd., MediaTek Inc., Zhejiang University, Qualcomm Inc., Owl Reality, Joint Video Exploration Team (JVET) of ITU-T SG 16 WP 3 and ISO/IEC JTC 1/SC 29/WG 11, 5th Meeting: Geneva. CH, Jan. 12-20, 2017, pp. 1-15.

HTC, "HTC Vive", Available at https://www.htcvive.com/us/, retrieved on Apr. 4, 2019, pp. 1-3.

Norkin et al., "Call for Test Materials for Future Video Coding Standardization", JVET-B1002, Joint Video Exploration Team (JVET) of ITU-T SG 16 WP 3 and ISO/IEC JTC 1/SC 29/WG 11, 2nd Meeting: San Diego, USA, Feb. 20-26, 2016, pp. 1-4.

Oculus, "Oculus Rift", Available at https://www.oculus.com/en-us/rift/, retrieved on Apr. 4, 2019, pp. 1-19.

Requirements, "Requirements for OMAF", ISO/IEC MPEG N16143, San Diego, US, Feb. 2016, 2 pages.

TNO, "5G and Future Media Consumption", ISO/IEC MPEG m37604, San Diego, US, Feb. 2016.

Vishwanath et al., "AHG8: Suggested Test Methodology for Evaluating Projection Formats for 360 Video Coding", JVET-D0074, InterDigital Communications Inc., Joint Video Exploration Team (JVET) of ITU-T SG 16 WP 3 and ISO/IEC JTC 1/SC 29/WG 11, 4th Meeting: Chengdu, CN, Oct. 15-21, 2016, pp. 1-11.

Ye et al., "Algorithm Descriptions of Projection Format Conversion and Video Quality Metrics in 360Lib", JVET-E1003, Joint Video Exploration Team (.JVET) of ITU-T SG 16 WP 3 and ISO/IEC JTC 1/SC 29/WG 11, 5th Meeting: Geneva, CH, Jan. 12-20, 2017, pp. 1-22.

\* cited by examiner

| 4 | 0 | 5 |
|---|---|---|
| 3 | 1 | 2 |

FIG. 7

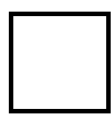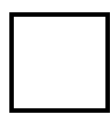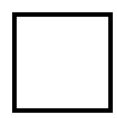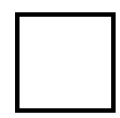
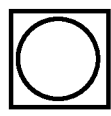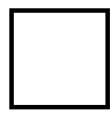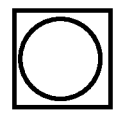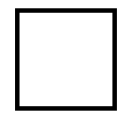
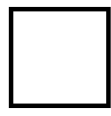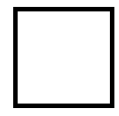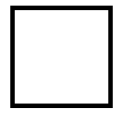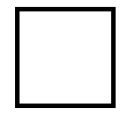
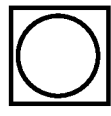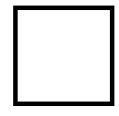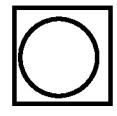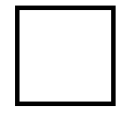
FIG. 15

GEOMETRY CONVERSION AND FRAME PACKING ASSOCIATED WITH 360-DEGREE VIDEOS

CROSS-REFERENCE TO RELATED APPLICATIONS

This application is the U.S. National Phase Entry under 35 U.S.C § 371 of Patent Cooperation Treaty Application No. PCT/US2017/055569, filed Oct. 6, 2017, which claims the benefit of U.S. Provisional Patent Application No. 62/405,765, filed on Oct. 7, 2016, the disclosure of which is incorporated in its entirety herein.

BACKGROUND

Virtual reality (VR) is entering many application areas including, but not limited to, healthcare, education, social networking, industry design/training, game, movie, shopping, entertainment, and/or the like. VR may enhance a viewer's experience, for example, by creating a virtual environment surrounding the viewer and generating a true sense of "being there" for the viewer. A VR system may accept user input through posture, gesture, eye gaze, voice, etc., and may provide haptics feedback to the user such that the user may interact with the VR environment in a natural way. A VR system may use 360-degree videos, which may be viewed from a 360-degree angle in the horizontal direction and from a 180-degree angle in the vertical direction.

SUMMARY

A three-dimensional (3D) point associated with a 360-degree video may be represented in a 3D coordinate system. The 3D point may be converted to a two-dimensional (2D) point represented in a 2D coordinate system. The conversion may use a first projection format (e.g., a cubemap projection format, an octahedron projection format, an icosahedron projection format, etc.), which may be associated with a plurality of projection planes. Each of the plurality of projection planes may be associated with a respective normal vector. A first projection plane may be selected from the plurality of projection planes based on those normal vectors and/or a location of the 3D point in the 3D coordinate system. For example, the 3D point and an origin of the 3D coordinate system may define a reference vector. The first projection plane may be selected so that, among the normal vectors associated with the plurality of projection planes, the normal vector associated with the first projection plane is the closest to being parallel to the reference vector.

The 3D point may be projected onto a projection point of the first projection plane. For example, the projection point may be where the reference vector intersects the first projection plane. The projection point may be an end-point of a projection vector that starts from the origin of the 2D coordinate system and ends at the projection point. Coordinates of the projection point in the 2D coordinate system may be derived by projecting the projection vector onto a first unit vector and a second unit vector associated with the first projection plane. The first unit vector may extend from a reference point (e.g., the origin of the 2D coordinate system) of the 2D coordinate system in a horizontal direction of the 2D coordinate system. The second unit vector may extend from the reference point of the 2D coordinate system in a vertical direction of the 2D coordinate system.

The projection point described above may correspond to a pixel of a first projected 2D image of the 360-degree video on the first projection plane, and the 2D coordinates of the projection point on the first projection plane may be derived further based on a width of the first projected 2D image and a height of the first projected 2D image. The projection point may be located on a first projection face defined by multiple vertices (e.g., three vertices if the projection face is triangular in shape). The reference point, the first unit vector, and the second unit vector may be determined based on the multiple vertices.

A pixel of a second projected 2D image associated with the 360-degree video may be mapped to the 3D point described above. The second projected 2D image may be associated with a second projection format and with a second projection plane defined in a 2D coordinate system. The second projection format may be one of a cubemap projection format, an octahedron projection format, or an icosahedron projection format, for example. The second projection format may be different than the first projection format. The 2D coordinate system defining the second projection plane may include an origin, a horizontal unit vector that extends from the origin of the 2D coordinate system in a horizontal direction of the 2D coordinate system, and a vertical unit vector that extends from the origin of the 2D coordinate system in a vertical direction of the 2D coordinate system. The location of the 3D point may be determined based on the origin of the 2D coordinate system, the horizontal and vertical unit vectors, and the coordinates of the pixel in the 2D coordinate system.

BRIEF DESCRIPTION OF THE DRAWINGS

Figure 7:
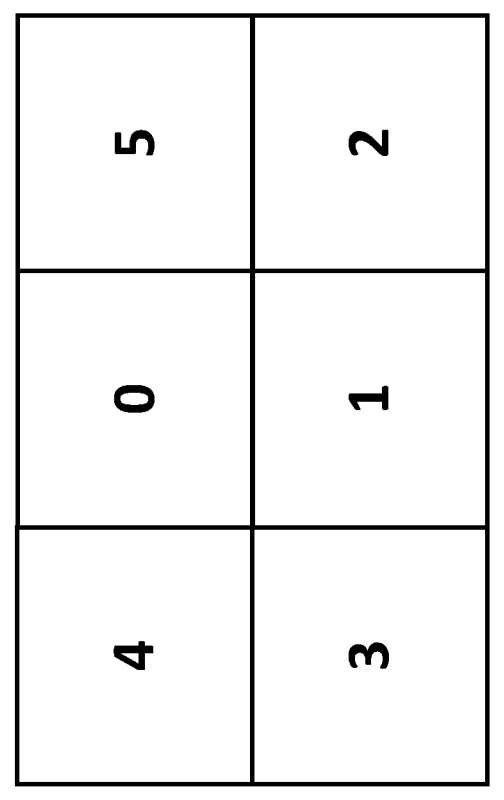

FIG. 7 is a diagram showing an example face arrangement for 3×2 cubemap projection.

FIG. 15 is a diagram showing an example sampling grid for 4:2:0 chroma format.

DETAILED DESCRIPTION

Figure 1A:
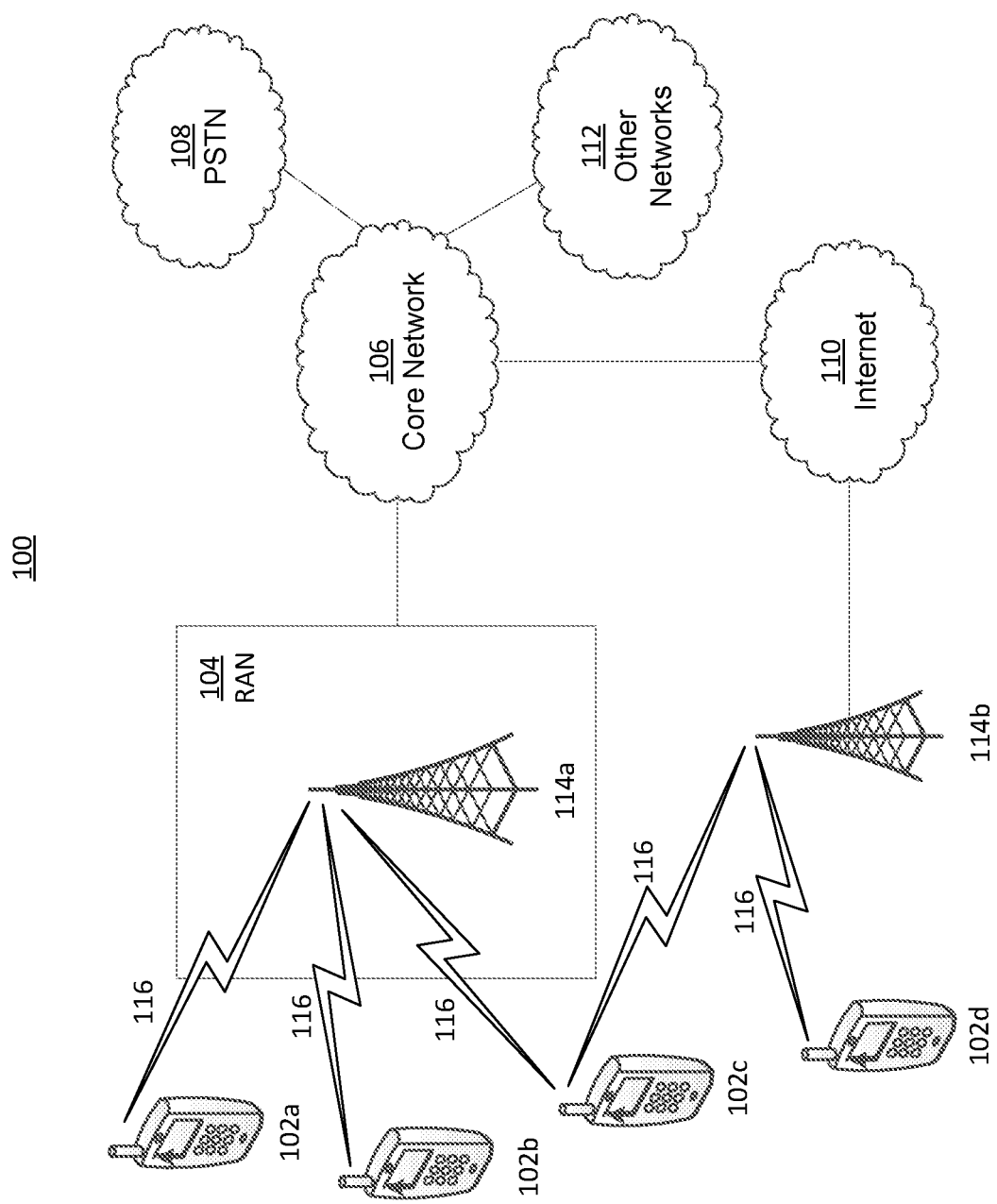
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (M IMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
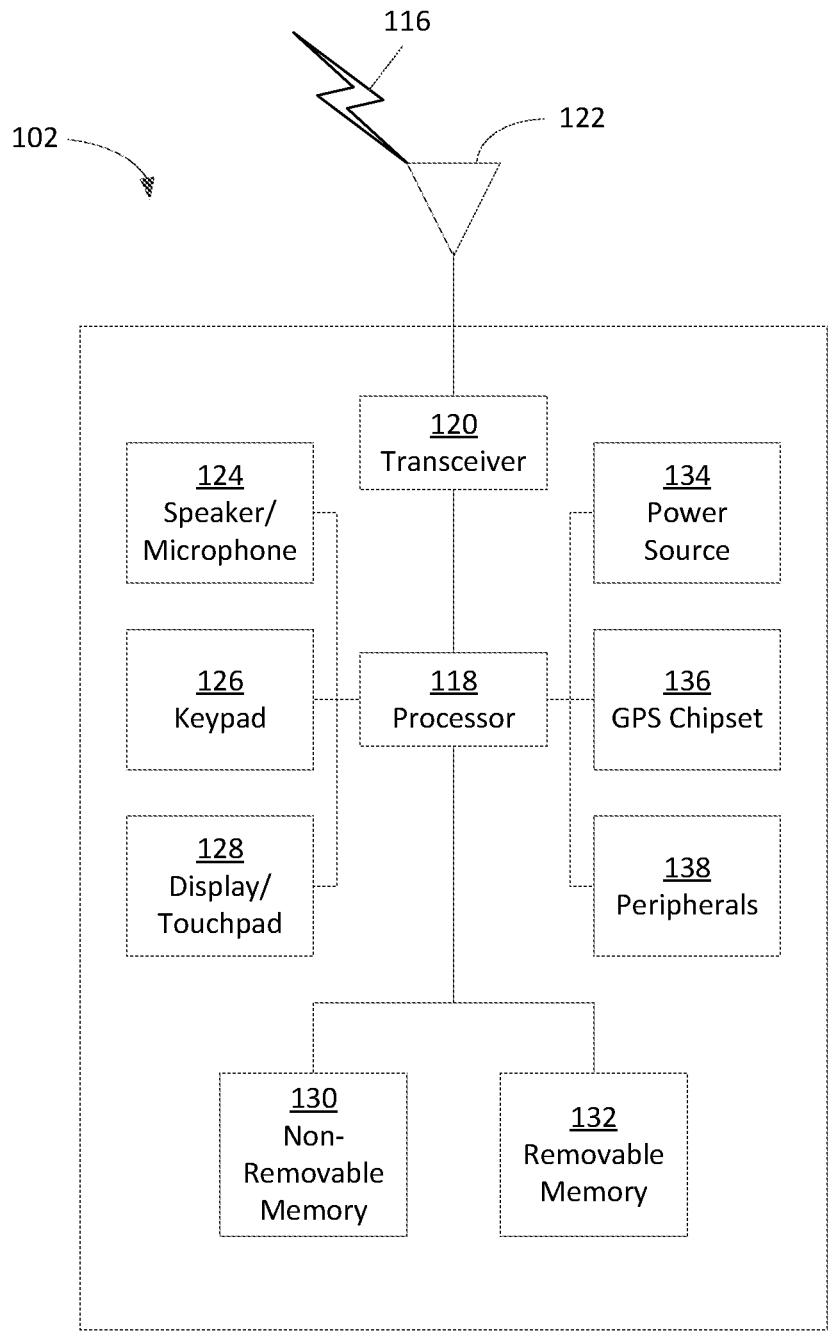
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
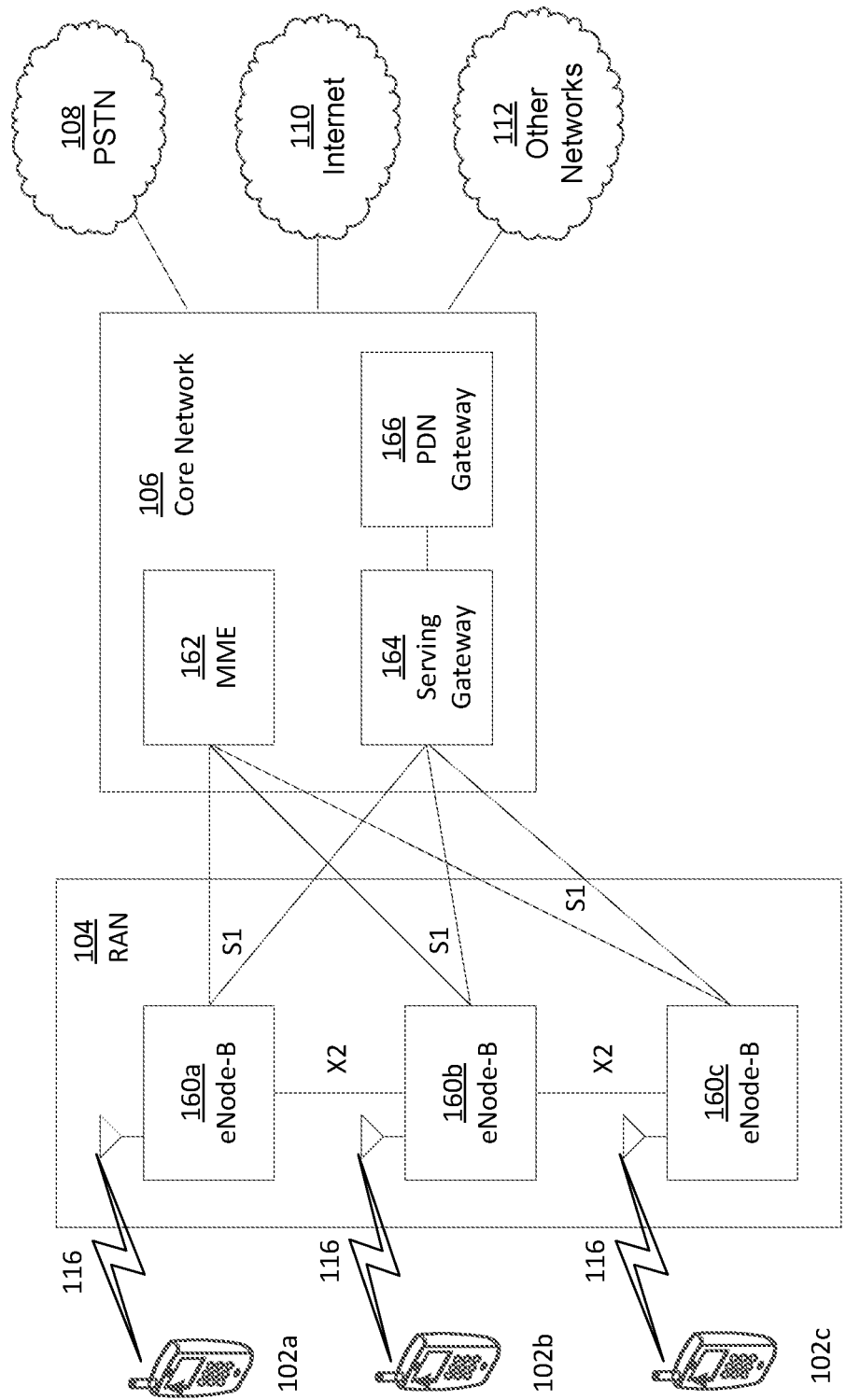
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
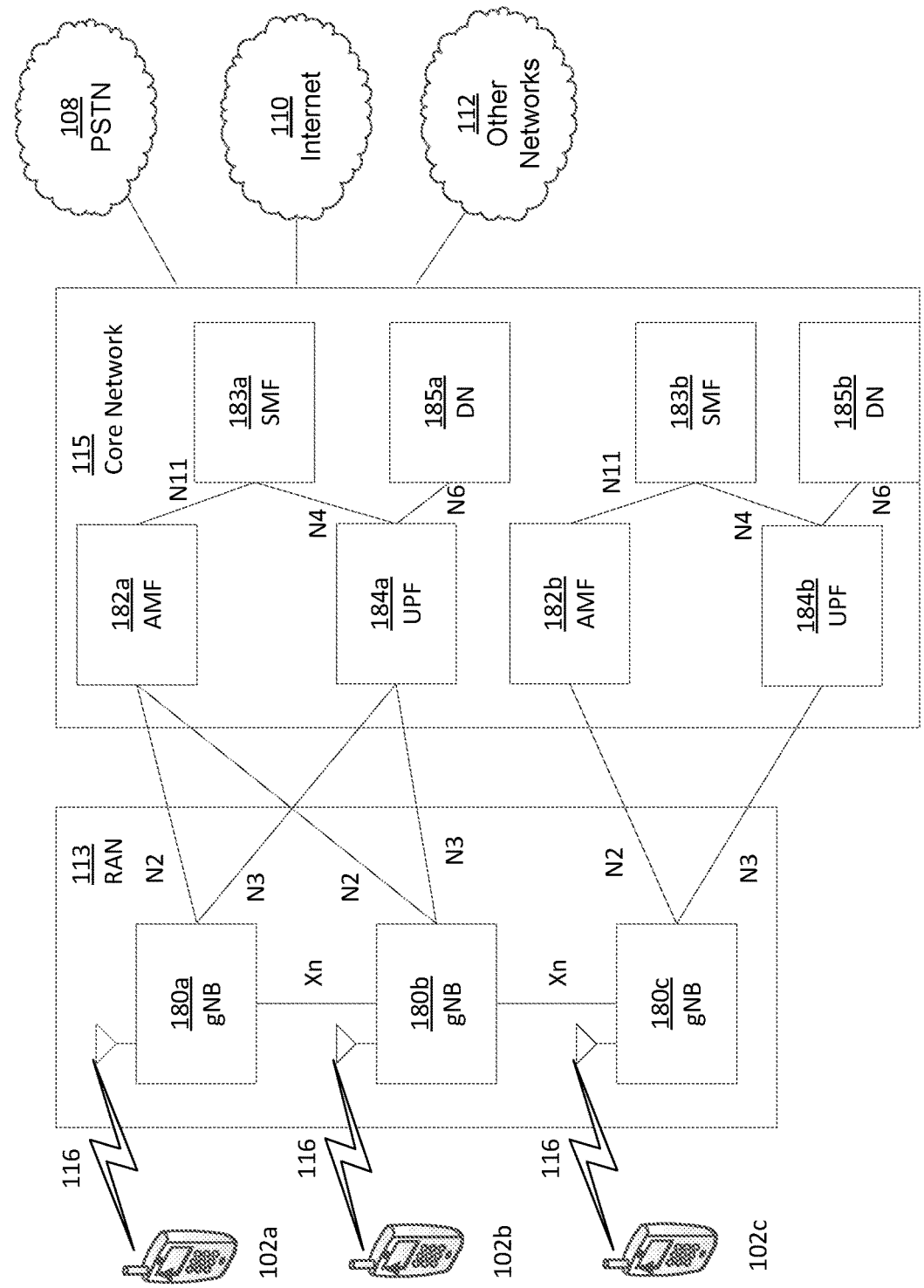
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

A detailed description of illustrative embodiments will now be described with reference to the various Figures. Although this description provides a detailed example of possible implementations, it should be noted that the details are intended to be exemplary and in no way limit the scope of the application.

A processing chain in a VR system may include video capturing, video processing, display, and/or user input reception and response. With respect to video capturing, a VR system may use multiple cameras to capture scenes from divergent views (e.g., 6 to 12 different views). These views may be stitched together to form a 360-degree video (e.g., with a high definition of 4K or 8K). Although the term "360-degree video" is used, it will be appreciated that the techniques described herein may be applicable to videos with a less-than-360 degree viewing angle. 360-degree videos may include omni-directional videos, spherical videos, six degree of freedom (6DoF) media, monoscopic and stereoscopic (3D) virtual reality videos, and/or the like.

The client or user side of a VR system may include a computation platform, a head mounted display (HMD), and/or a head tracking sensor. The computation platform may be responsible for receiving and decoding the 360-degree video, and/or generating a viewport for display. Two pictures (e.g., one for each eye) may be rendered for the viewport. The two pictures may be displayed in the HMD for stereoscopic viewing. One or more lenses may be used to magnify the images displayed in the HMD. The head tracking sensor may keep track (e.g., constantly) of a viewer's head orientation. Information about the orientation may be fed to the VR system so that a proper viewport picture may be displayed for the orientation. Certain VR systems may include a specialized touch device for the viewer to interact with objects in the virtual environment.

A VR system may be driven by a workstation with graphical processing unit (GPU) support. A VR system or the end-user side of a VR system may use a mobile device (e.g., such as a WTRU described herein) as an operating platform (e.g., for computation and/or other purposes), for HMD display and/or as a head tracking sensor. Spatial HMD resolution may be, for example, 2160×1200. Refresh rate may be, for example, 90 Hz. Field of view (FOV) may be, for example, about 110 degree. Sampling rate for a head tracking sensor may be, for example, 1000 Hz, to capture fast movements. A VR system may comprise a lens and/or a cardboard. A VR system may be driven by a smartphone. A VR system may be used for gaming. 360-degree video streaming services may be provided.

A 360-degree video may be used in VR and/or other application areas. The 360-degree video may be compressed and/or delivered, for example, using Dynamic Adaptive Streaming over HTTP (DASH)-based video streaming techniques. 360-degree video content may be represented with a spherical geometry structure. For example, synchronized multi-views may be captured by multiple cameras and may be stitched onto a sphere (e.g., as an integral structure). The sphere may be projected onto a 2D planar surface using geometry conversion techniques such as equirectangular projection (ERP).

Figure 2A:
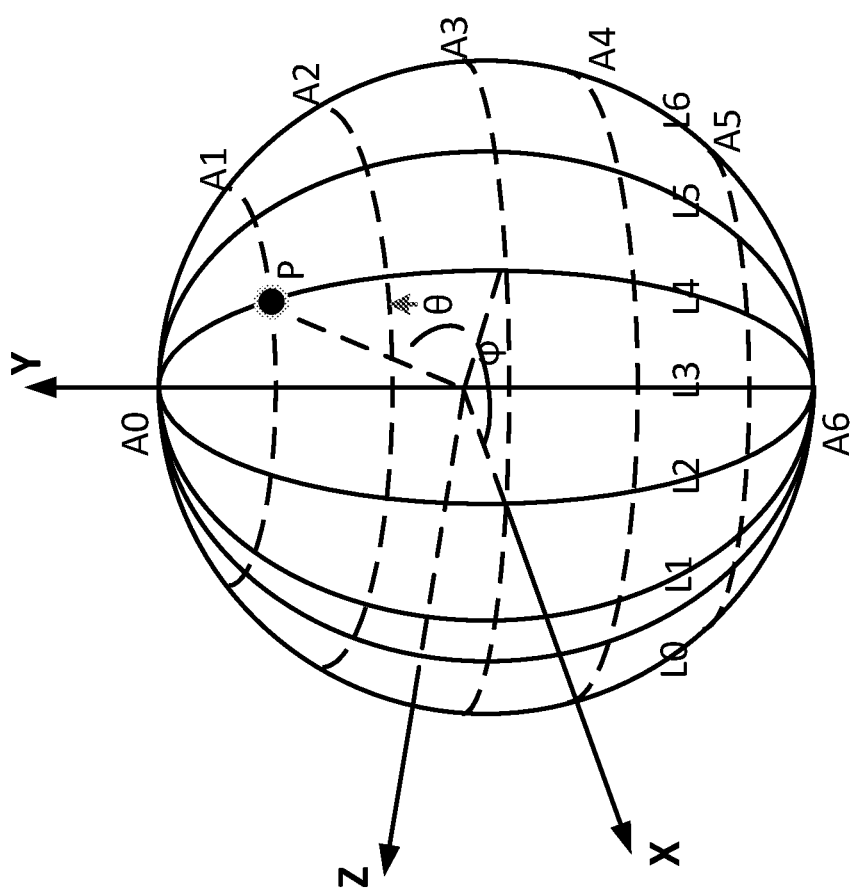
FIG. 2A is a diagram showing an example spherical sampling technique that may be used in equirectangular projection.
Figure 2B:
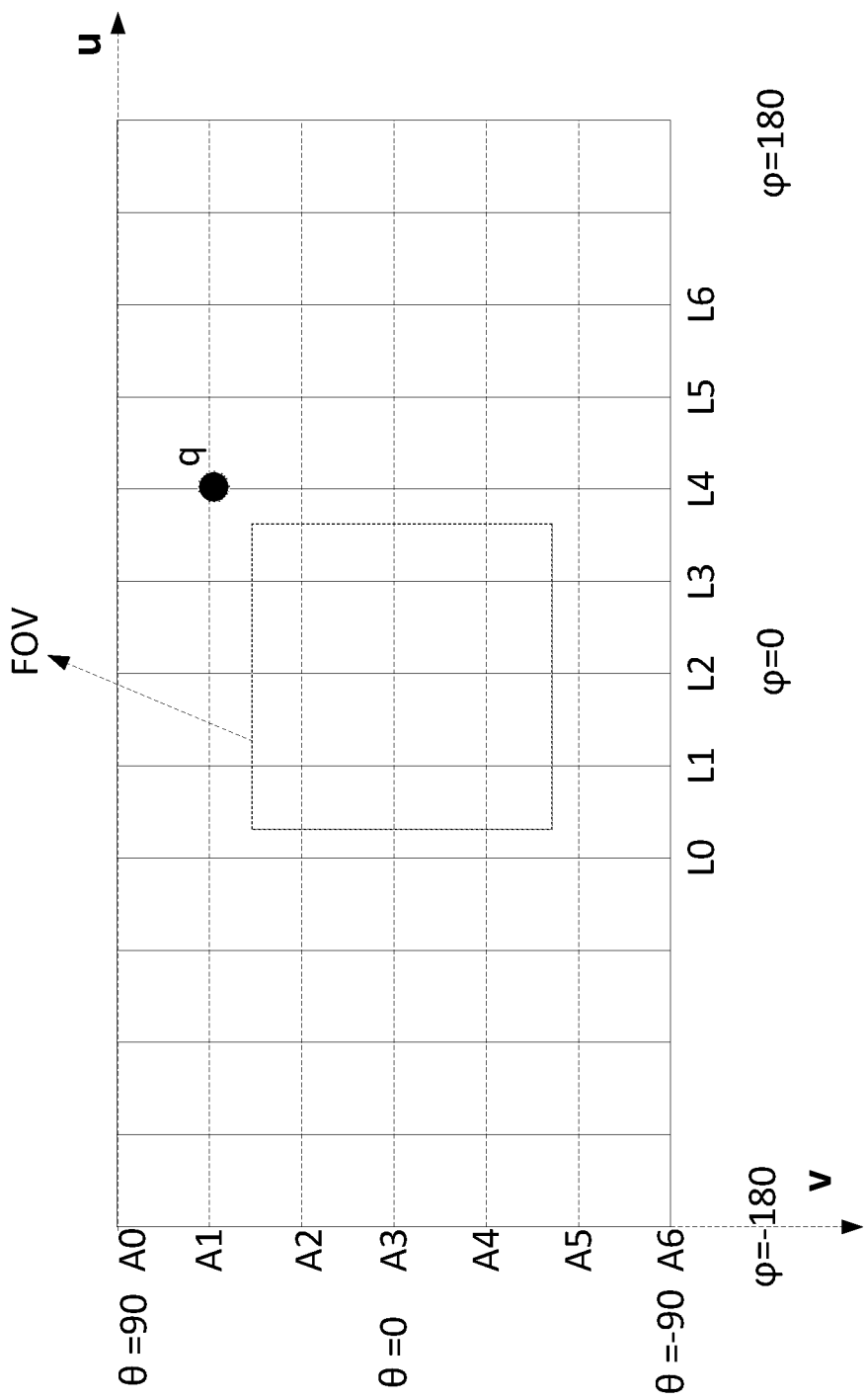
FIG. 2B is a diagram illustrating how a sphere may be projected onto a 2D plane using equirectangular projection.

FIG. 2A is a diagram showing an example spherical sampling technique that may be used in equirectangular projection. FIG. 2B is a diagram illustrating how a sphere may be projected onto a 2D plane using equirectangular projection. The longitude φ in the range [−π, π] may be referred to herein as yaw and the latitude θ in the range [−π/2, π/2] may be referred to herein as pitch in aviation. π may be the ratio of a circle's circumference to its diameter. (x, y, z) may represent the coordinates of a 3D point in a 3D space. (ue, ve) may represent the coordinates of a 2D point in a 2D plane onto which the 3D point may be projected, e.g., through equirectangular projection. Using these symbols, the projection of a spherical image into a 2D planar picture through ERP may be represented as shown in Equations (1) and (2).

$$ue = (\varphi/(2*\pi)+0.5)*W \quad \text{Eq. 1}$$

$$ve = (0.5-\theta/\pi)*H \quad \text{Eq. 2}$$

where W and H may be the width and height of the 2D planar picture, respectively. As shown in FIGS. 2A and 2B, point P, which may be the cross point between longitude L4 and latitude A1 on the sphere, may be mapped to a unique point q in the 2D plane using Equations (1) and (2). Point q in the 2D plane may be projected back to point P on the sphere, for example via inverse projection. The field of view (FOV) in FIG. 2B shows an example of mapping an FOV in a sphere to an FOV on a 2D plane, with a viewing angle (e.g., along the X axis) of about 110 degree.

A 360-degree video may be mapped to a 2D video, which may then be coded with a video coder/decoder (codec) such as an H.264 codec or an HEVC codec before being delivered to a client. At the client side, the video may be decoded (e.g., into an ERP format) and rendered based on a user's viewport. For example, the portion associated with a FOV in an ERP picture may be projected and displayed on an HMD. The characteristics of such an ERP picture may be different from a conventional 2D picture (e.g., a rectilinear video picture). For example, the top portion of an ERP picture corresponding to the North Pole of the concerned sphere and the bottom portion of the ERP picture corresponding to the South Pole of the concerned sphere may be stretched compared to the middle portion of the ERP picture corresponding to the Equator of the concerned sphere. ERP sampling in a 2D spatial domain may be uneven.

Further, in an ERP picture, areas closer to the top and bottom portions of the picture may be less interesting to a viewer compared to areas closer to the middle portion of the picture. This may be because, for example, the viewer may not focus on the top and/or bottom portion of the picture for a long duration. The top and/or bottom portion of the picture may also be stretched (e.g., due to warping effects), and may occupy a large area of the 2D picture. These large areas may take a large number of bits to code. To reduce the bit costs associated with coding an ERP picture, certain processing techniques may be applied. For example, pre-processing such as smoothing may be applied to the pole areas in order to reduce the number of bits used to represent those areas.

Figure 3A:
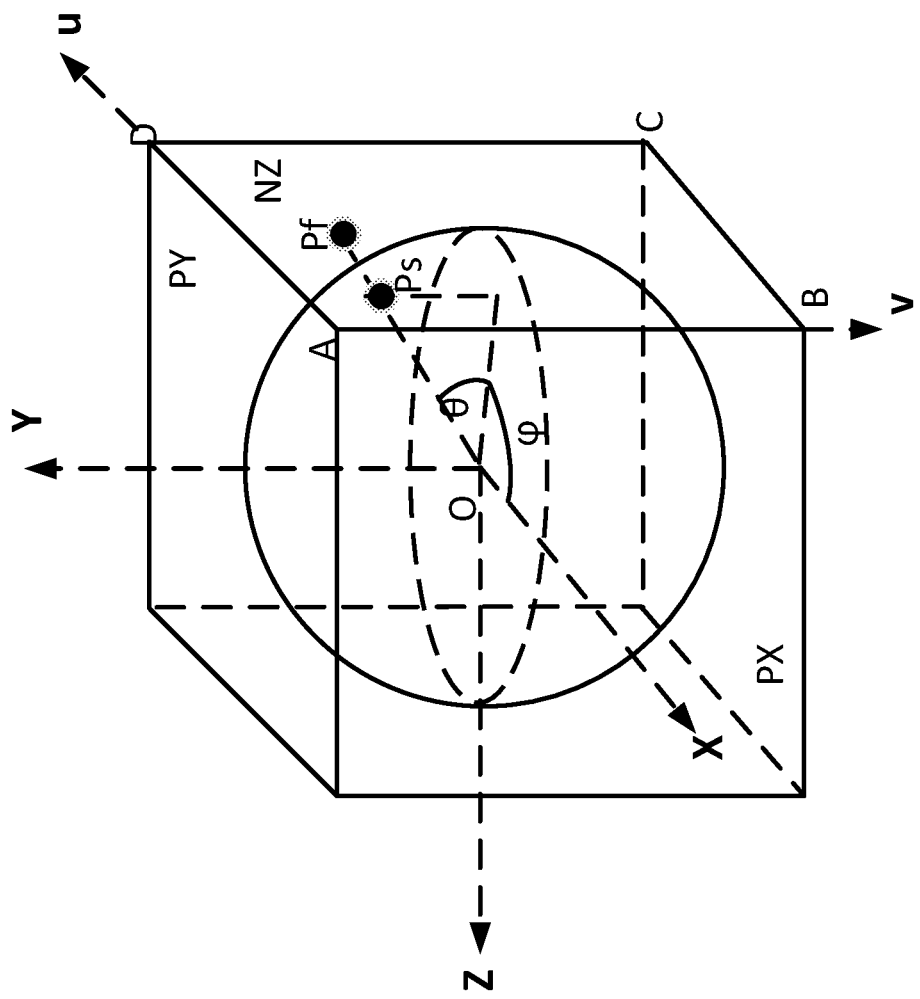
FIG. 3A is a diagram showing an example 3D geometry structure that may be used in cubemap projection.
Figure 3B:
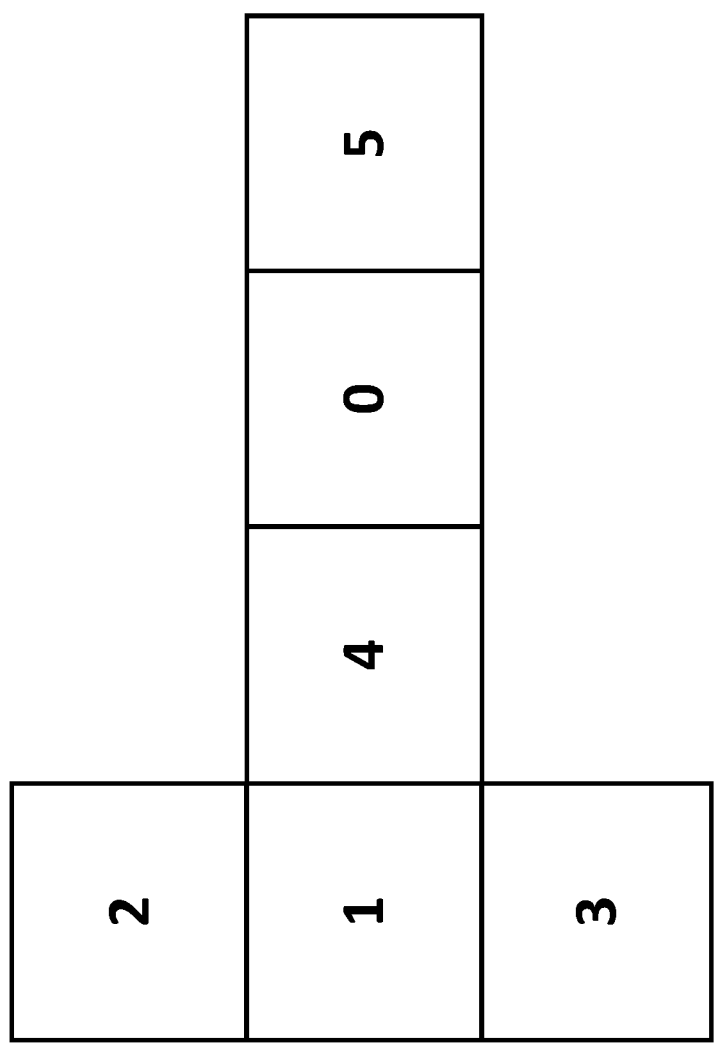
FIG. 3B is a diagram showing an example 2D planar picture created using 4×3 frame packing and six projection faces.
Figure 3C:
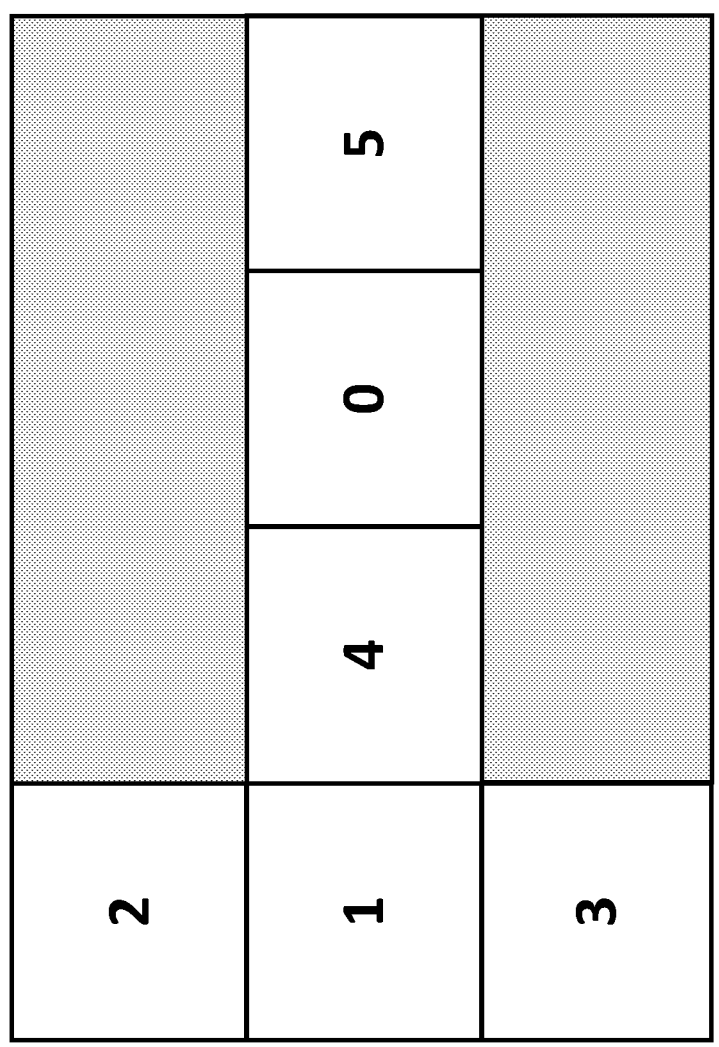
FIG. 3C is a diagram showing an example 2D planar picture produced using cubemap projection and padding.

In addition to ERP, other geometric projection techniques may be used to represent a 360-degree video. These other projection techniques may include, for example, cubemap projection (CMP), equal-area projection (EAP), cylinder projection, pyramid projection, octahedron projection, etc. Cubemap projection may utilize multiple faces, one or more of which may be a planar square. FIG. 3A is a diagram showing an example 3D geometry structure that may be used in cubemap projection. A cubemap may comprise six projection faces (e.g., six rectangular faces). If the radius of the tangent sphere shown in FIG. 3A is one, the lateral length of each face (square) of the cubemap may be two. FIG. 3B is a diagram showing an example 2D planar picture created using 4×3 frame packing and six projection faces. Such a packing technique may be used in the encoding and delivery of 360-degree videos. FIG. 3C is a diagram showing an example 2D planar picture produced using cubemap projection and padding. The grey parts may represent padded regions that are used to fit the projection (e.g., filled samples) into a rectangular picture. For a face of the cubemap, the picture included therein may look like a normal 2D picture. The boundary of the face may or may not be continuous. For example, a straight line crossing two neighboring faces may be curved at the boundary of those two faces. Motions at the face boundary may be discontinuous.

Figure 4A:
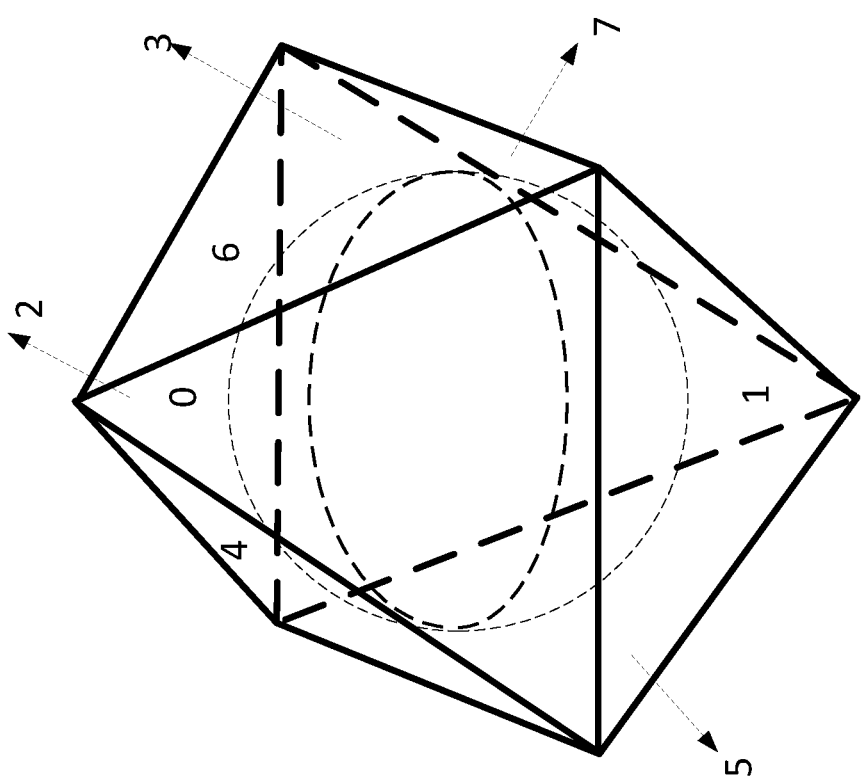
FIG. 4A is a diagram showing an example 3D geometry structure that may be used in octahedron projection.
Figure 4B:
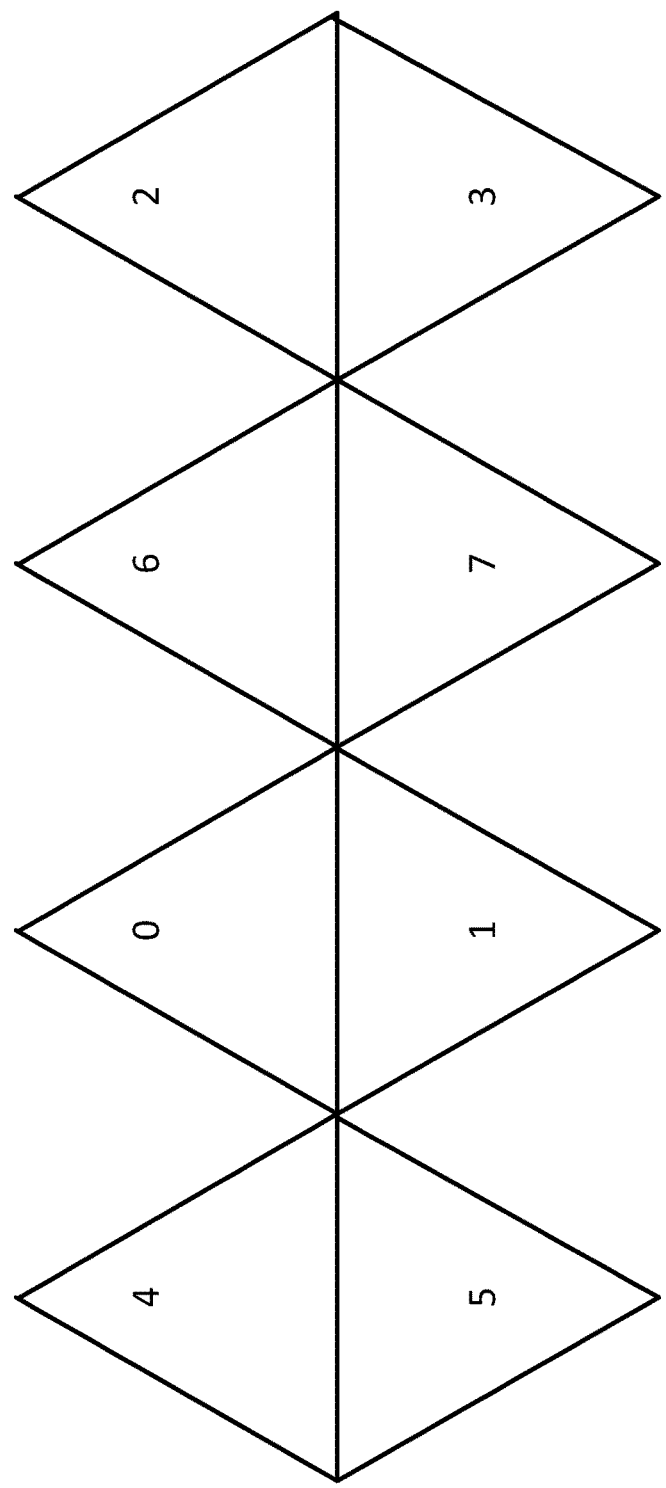
FIG. 4B a diagram showing an example 2D planar picture created via octahedron projection and frame packing.
Figure 4C:
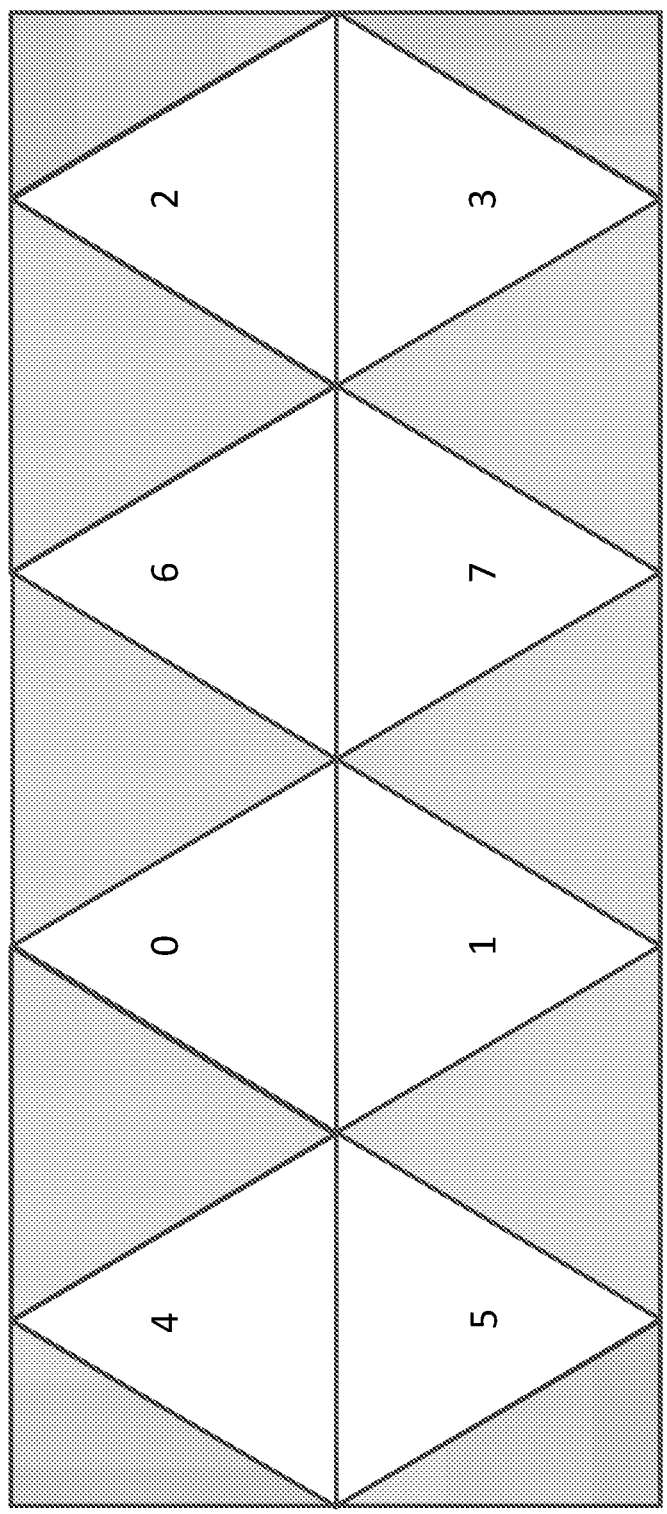
FIG. 4C is a diagram showing an example 2D planar picture produced with octahedron projection, frame packing and padding.

FIG. 4A is a diagram showing an example 3D geometry structure that may be used in octahedron projection (OHP). An octahedron may include eight equal-lateral triangle faces, four of which may meet at a vertex. If an edge length of the octahedron is $\alpha$, the radius of the inscribed sphere (tangent to each of the octahedron's face) may be $\alpha/\sqrt{T}$. FIG. 4B a diagram showing an example 2D planar picture created via octahedron projection (e.g., using eight faces) and frame packing. FIG. 4C is a diagram showing an example 2D planar picture produced with octahedron projection, frame packing, and padding. The grey areas may present padded areas (e.g., filled samples) to fit the projection into a rectangular picture.

Figure 5A:
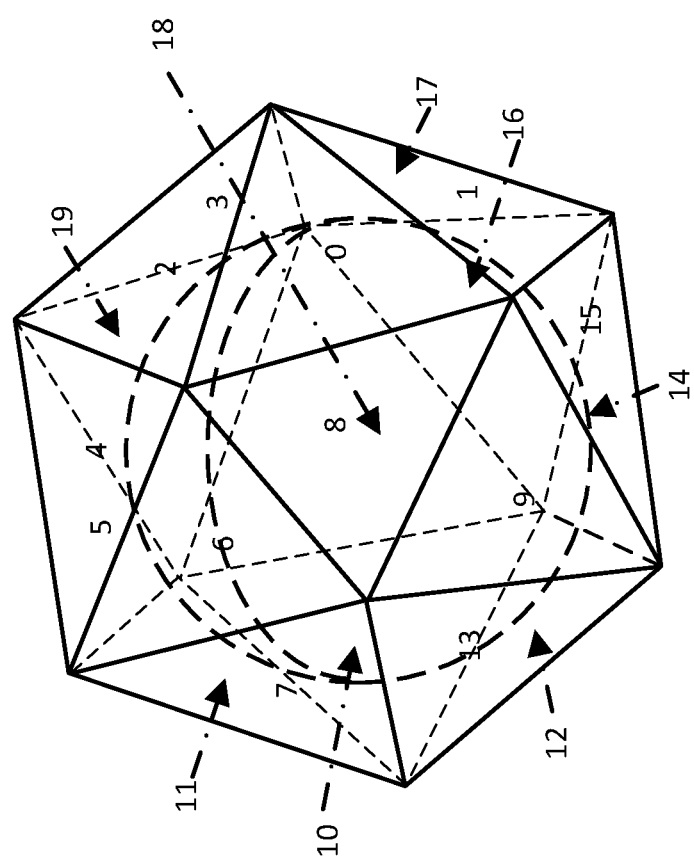
FIG. 5A is a diagram showing an example 3D geometry structure that may be used in icosahedron projection.

FIG. 5A is a diagram showing an example 3D geometry structure that may be used in icosahedron projection (ISP). An icosahedron may be a polyhedron with 20 triangular faces, five of which may meet at a vertex (e.g., at each of the twelve vertices of the icosahedron). If an edge length of the icosahedron is $\alpha$, the radius of the inscribed sphere may be $$\frac{\sqrt{3}}{12}(3+\sqrt{5})\alpha.$$

Figure 5B:
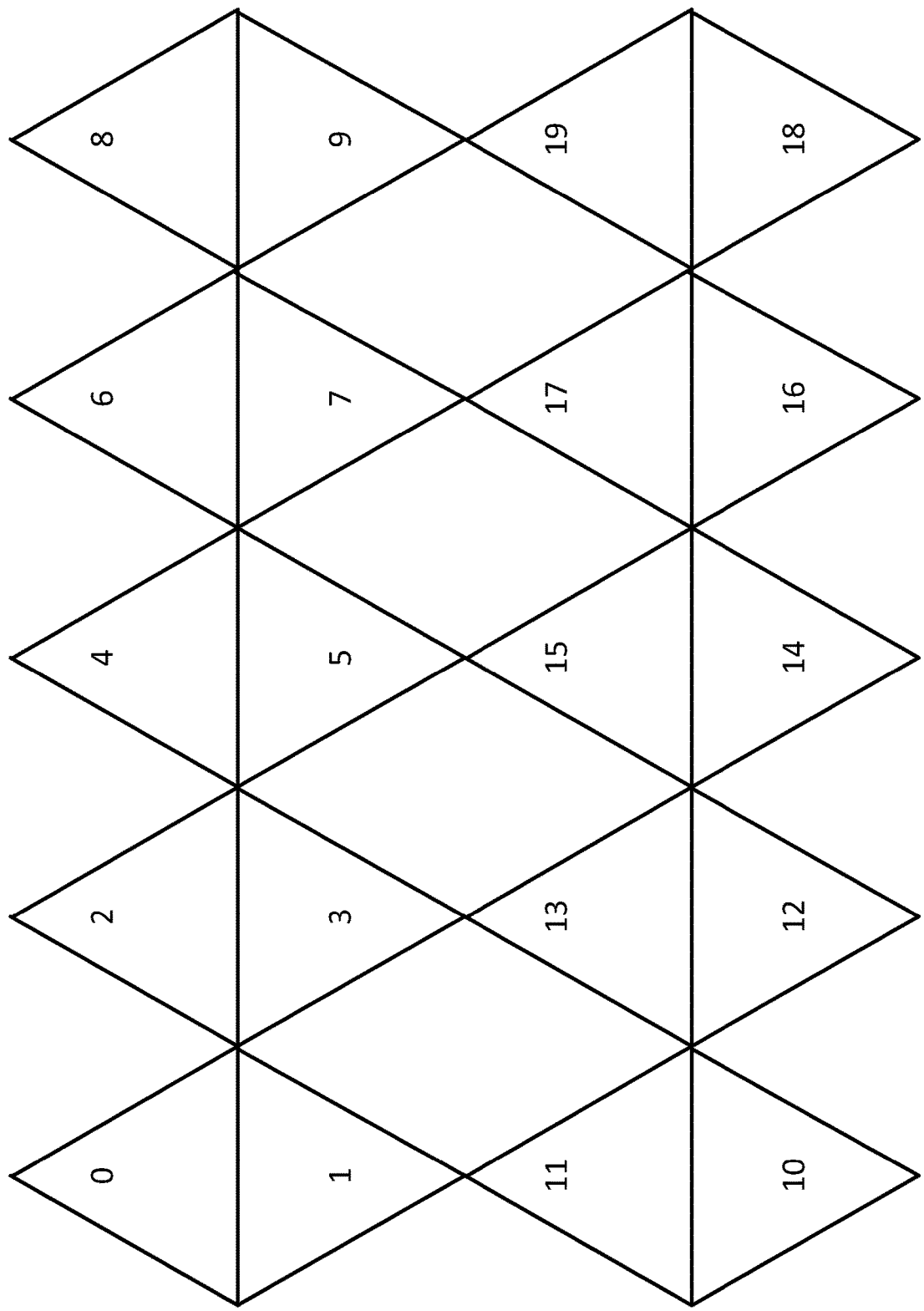
FIG. 5B is a diagram showing an example 2D planar picture created via icosahedron projection and frame packing.
Figure 5C:
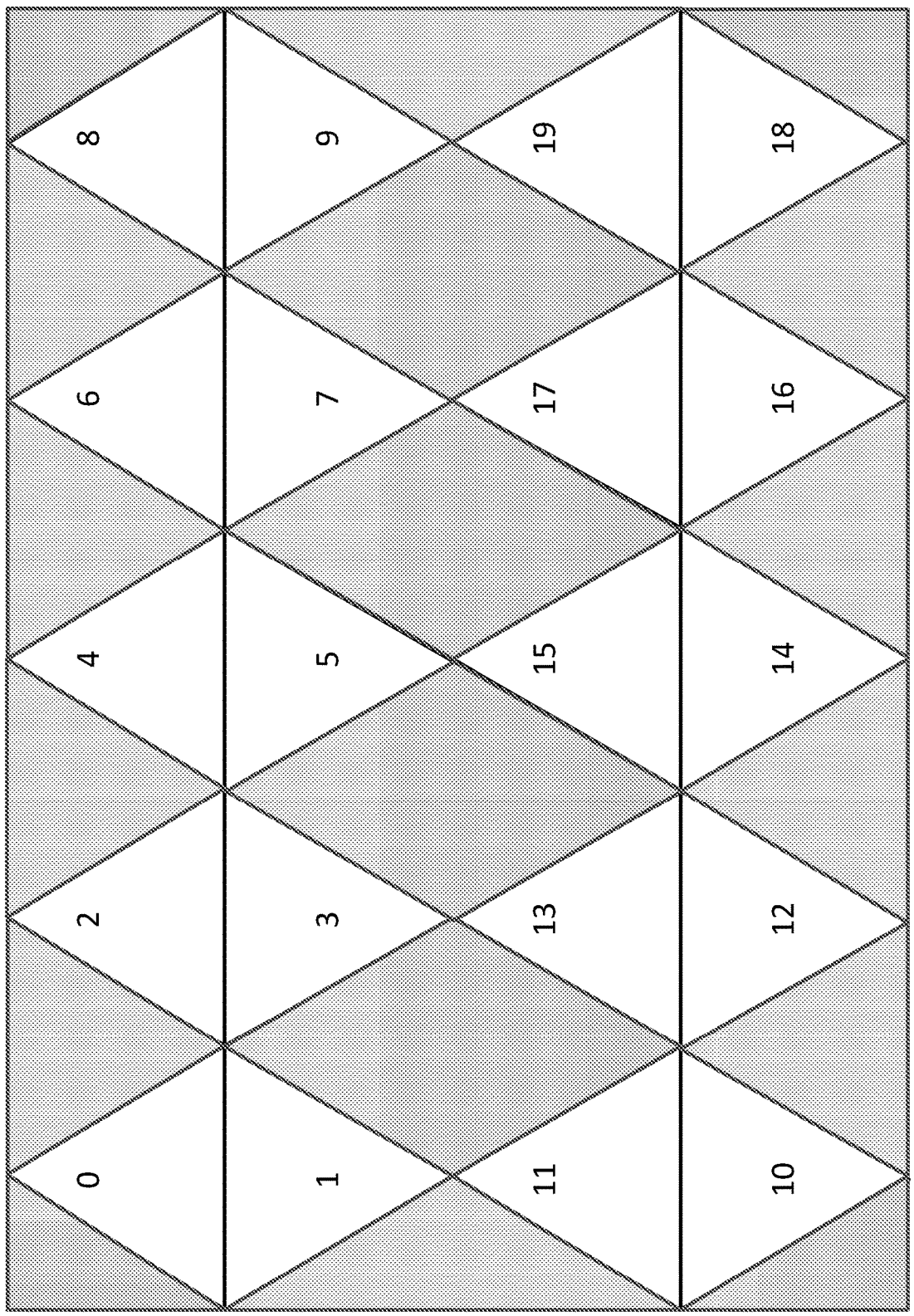
FIG. 5C is a diagram showing an example 2D planar picture created via icosahedron projection, frame packing, and padding.

FIG. 5B is a diagram showing an example 2D planar picture created via icosahedron projection and frame packing. FIG. 5B is a diagram showing an example 2D planar picture created via icosahedron projection, frame packing, and frame packing. The grey areas may represent padded areas (e.g., filled samples) used to fit the projection into a rectangular picture.

The ERP format described herein may be supported in 360-degree cameras and stitching software. To encode a 360-degree video that has been projected into the ERP format into a different projection format (e.g., CMP, OHP and/or ISP), the 360-degree video may be converted from the ERP format to the corresponding projection format. Without loss of generality, conversion between ERP and CMP is described herein as an example. In the cube shown in FIG. 3A, a face of the cube may be associated with one of the three axes going from the center of the sphere to the center of the face. Let "P" denote positive and "N" denote negative. "PX" may then represent the direction along positive x axis from the center of the sphere, and "NX" may represent the reverse direction of PX. Similar notation may be used for PY, NY, PZ, and NZ. PX, NX, PY, NY, PZ, and NZ may correspond to the front, back, top, bottom, left, and right faces of the cube, respectively. The faces may be indexed from 0 to 5. Let Ps (X_s, Y_s, Z_s) be a point on the sphere and assume the sphere has a radius of 1. The point Ps may be represented in yaw $\varphi$ and pitch $\theta$ as illustrated by Equations (3)-(5):

$$X\_s=\cos(\theta)\cos(\varphi) \qquad \text{Eq. 3}$$

$$Y\_s=\sin(\theta) \qquad \text{Eq. 4}$$

$$Z\_s=-\cos(\theta)\sin(\varphi) \qquad \text{Eq. 5}$$

Let Pf be the intersecting point on the cube when a line connecting the center of the sphere and Ps is extended to intersect the cube. Assume Pf is on face NZ. The coordinates of Pf, (X_f, Y_f, Z_f), in the 3-D space may be derived as illustrated by Equations (6)-(8):

$$X\_f=X\_s/|Z\_s| \qquad \text{Eq. 6}$$

$$Y\_f=Y\_s/|Z\_s| \qquad \text{Eq. 7}$$

$$Z\_f=-1 \qquad \text{Eq. 8}$$

where |x| represents the absolute value of a variable x. The coordinates of Pf, (uc, vc), in the 2D plane of face NZ, may be calculated as:

$$uc = W*(1-X\_f)/2 \qquad \text{Eq. 9}$$

$$vc = H*(1-Y\_f)/2 \qquad \text{Eq. 10}$$

Using Equations (3) to (10), a relationship may be derived between a 2D point (uc, vc) on a particular face of a cube onto which the sphere is projected (e.g., using CMP), and a point ($\varphi$, $\theta$) on the sphere. Further, a relationship between the point ($\varphi$, $\theta$) on the sphere and a 2D point (ue, ve) in an ERP-projected image of the sphere may be known from Equations (1) and (2) above. Using these relationships, geometry mapping from a CMP image to an ERP image can be expressed as follows.

A mapping may be established between a 2D point in the 2D space and a corresponding 3D point in the 3D space. For example, the coordinates of 3D point Pf (X_f, Y_f, Z_f) in the 3-D space may be calculated based on Pf's 2D coordinates (uc, vc) on face NZ (e.g., as shown in FIG. 3A) and according to the relationship shown in Equations (9) and (10). When point Pf is projected onto the sphere, the coordinates of the corresponding point Ps on the sphere, (X_s, Y_s, Z_s), may be calculated based on the relationship shown in Equations (6)-(8). The position of point Ps on the sphere, ($\varphi$, $\theta$), may be calculated based on the 3D coordinates of Ps, e.g., according to the relationship shown in Equations (3)-(5). Similarly, a mapping may be established between a point in the 3D space and a point in the 2D space. For example, a point (ue, ve) in an equirectangular image to which point Ps is projected may be calculated based on the coordinates of Ps, ($\varphi$, $\theta$), in accordance to the relationship shown in Equations (1) and (2).

The projective relationship between CMP and ERP (e.g., as described in equations (3)-(10)) may be used to convert a video from an ERP format to a CMP format, for example by performing the operations described above in a reverse direction. For example, with a 360-degree video in the ERP format as input, the following operations may be performed to convert the video into the CMP format. For a sample position (uc, vc) in the CMP format, corresponding coordinates (ue, ve) in the ERP format may be derived using the geometric mapping techniques described herein. If the derived coordinates (ue, ve) in the ERP format are not at an integer sample position, interpolation filter may be applied to obtain the sample value (e.g., at a fractional position) using samples from neighboring integer positions.

Figure 6:
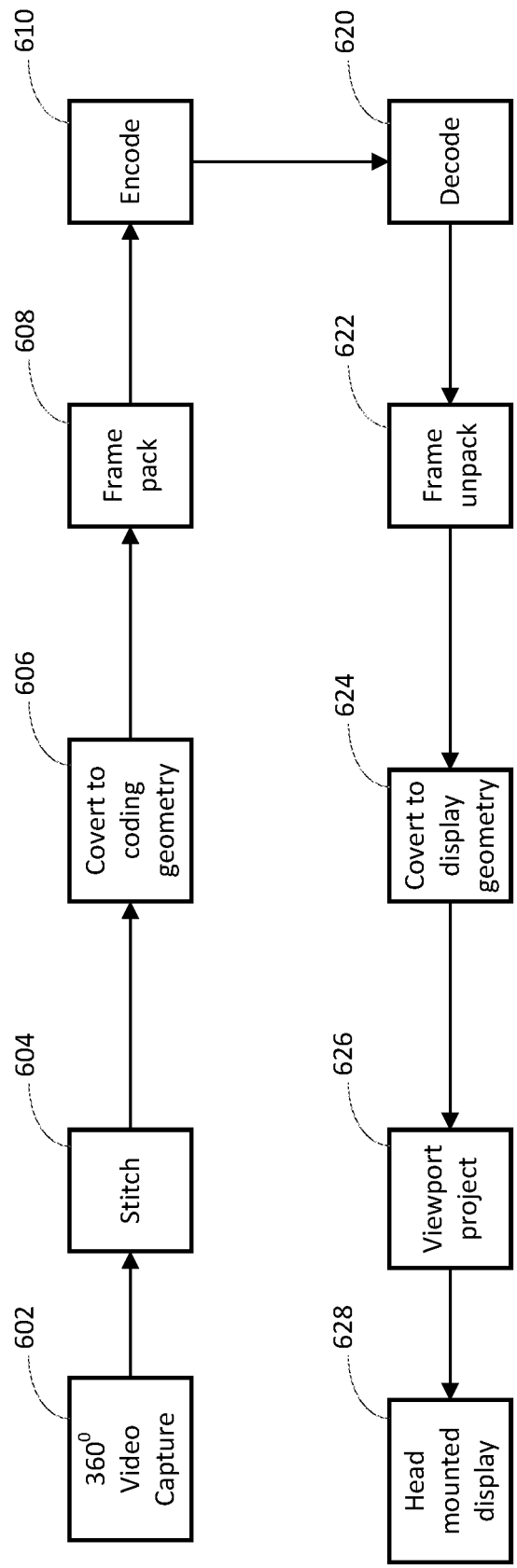
FIG. 6 is a diagram showing an example 360-degree video processing workflow.
Figure 8:
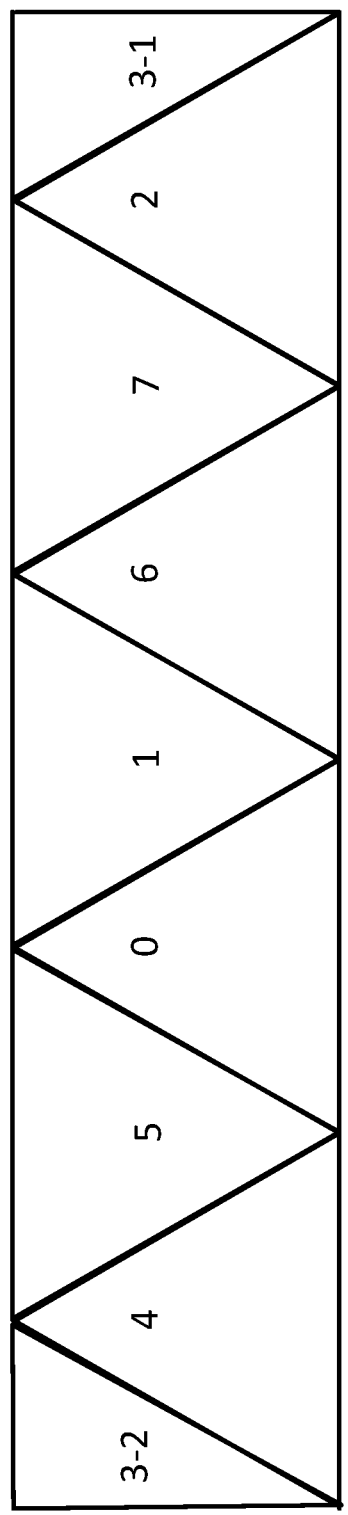
FIG. 8 is a diagram showing an example face arrangement for frame-packed octahedron projection.

FIG. 6 shows an example work flow in a 360-degree video system. At 602, 360-degree video may be captured using multiple cameras arranged to cover a spherical space. At 604, the video captured by the cameras may be projected and/or stitched together according to a first format (e.g., an ERP format). At 606, the first format may be converted to a second format (e.g., such as CMP, OHP and/or ISP), e.g., for encoding purposes. The video may go through additional processing such as frame packing at 608 before being encoded at 610 (e.g., using a video codec). Greater details about frame packing will be provided below.

An encoded video may be delivered to an end-user device, for example via dynamic streaming or broadcasting. At 620, the encoded video may be decoded (e.g., decompressed) by the end-user device. The decoded video may be processed in one or more steps that are reverse to those described above (e.g., frame unpacking at 622). At 624, the video may be converted to a format (e.g., an ERP format) suitable for display. Further projection of the video may be performed at 626, e.g., via viewport projection according to a user's viewing angle, before the video is displayed in a HMD at 628.

Chroma components may be subsampled to a smaller resolution than that of a luma component. Chroma subsampling may reduce the amount of video data to be encoded and/or delivered, and may thus save bandwidth and/or computing power (e.g., without significantly affecting the video quality). With a 4:2:0 chroma format, both chroma components may be subsampled at ¼ of the luma resolution (e.g., ½ horizontally and ½ vertically). Chroma subsampling may cause a chroma sampling grid to be different than a luma sampling grid. At one or more of the stages shown in FIG. 6, the video being processed may be in a chroma format with subsampled chroma components.

With certain projection techniques such as ERP, spherical coordinates of a 3D point on a sphere may be mapped into 2D planar coordinates. With certain other projection techniques such as CMP, OHP and/or ISP, 3D points on a sphere may be mapped onto multiple faces. The multiple faces may be packed into a 2D image (e.g., a rectangular image). This may be referred to as frame packing. A frame-packed image may be used as the input to a coding process. Different frame packing configurations may be used (e.g., 3×2 and 4×3). For example, in a 3×2 configuration, the six cubemap faces may be packed into 2 rows, with 3 faces in one row. In a 4×3 configuration, the 4 faces PX, NZ, NX, PZ may be packed into one row (e.g., the center row), and the faces PY and NY may be separately packed into two different rows (e.g., the top and bottom rows relative to NX).

For OHP, eight triangle faces may be packed into one row. The eight triangle faces may be interleaved in an alternating order of odd-indexed faces and even-indexed faces. In certain examples, the third triangle face may be split into two parts that may be respectively placed to the left of the fourth triangle face and the right of the second triangle face (e.g., so as to ensure that the output picture has a substantially rectangular shape). For ISP, twenty triangle faces may be grouped into a first set and a second set, for example by evenly splitting the icosahedron in the 3D space. The second set of triangle faces may be vertically flipped and may be packed together with the first set of triangle faces. Partial faces may be split to half (e.g., before frame packing) to produce a rectangular output region.

Using the face indices defined in FIGS. 3-5, FIGS. 7-9 show example face arrangements for 3×2 CMP, compacted OHP (COHP) and compacted ISP (CISP), respectively. Note that the faces in FIG. 9 marked by encircled numbers may correspond to faces that have been vertically flipped (e.g., before frame-packing) while the remaining faces (e.g., those marked by un-encircled numbers) may correspond to faces that have not been flipped.

When a spherical image is projected into a 2D image using ERP, distortion may occur due to warping and/or other undesirable effects introduced in the projection process. Redundant pixel information may be generated in an ERP image, for example, at the top and/or the bottom of the image. For at least these reasons, an image generated in the ERP format may be remapped (e.g., converted) to another projection format (e.g., CMP, OHP, ISP, etc.). Frame packing may be applied to the image generated through the projection and/or conversion process, which may make the use of existing encoders and decoders possible in 360-degree video coding.

The conversion of a 360-degree video from an ERP format (e.g., a source format) to another projection format (e.g., a target format), or vice versa, may be performed as follows. For each sample point (uc, yc) in the target format, the coordinates (ue, ye) of a corresponding sample point in the ERP format may be derived (e.g., calculated). The derivation or calculation may include 2D-to-3D mapping and/or 3D-to-2D mapping. For example, the 2-D coordinates (uc, yc) may be mapped to a point in the 3D space (e.g., a 3-D point). The 3-D point may be projected onto a point belonging to the surface of a unit sphere. This point on the sphere may then be mapped to the point (ue, ye) on the ERP plane via 3D-to-2D mapping.

Figure 10:
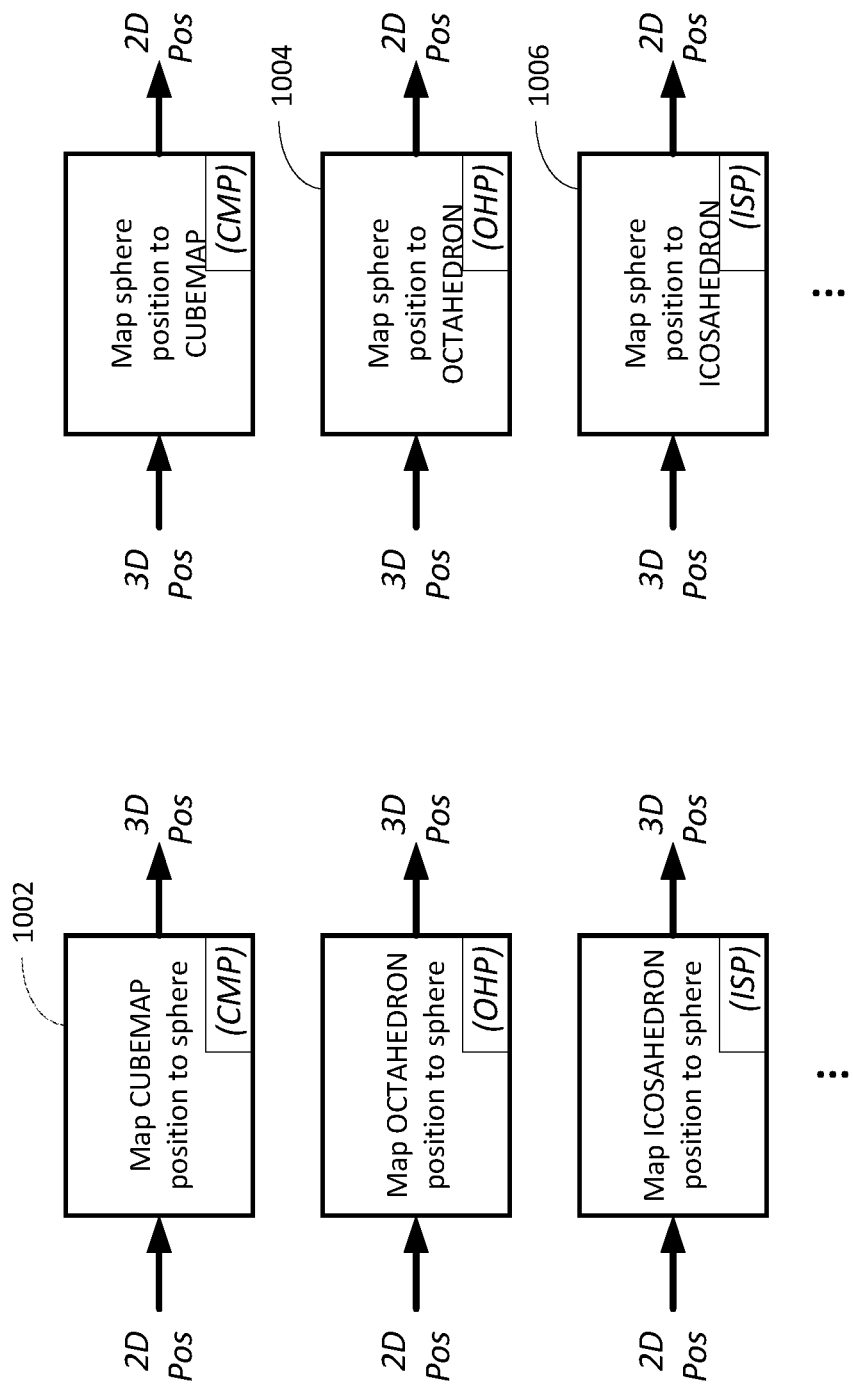
FIG. 10 shows multiple example modules each designated to handle a particular type of conversion between two different projection formats.

Equations (6) to (10) described herein may be used for 3D-to-2D and/or 2D-to-3D mapping when a 360-degree video is converted between ERP and CMP. Conversions between other project formats (e.g., OHP, ISP, etc.) may utilize different mapping functions. FIG. 10 shows an example architecture in which multiple modules and/or components are used to handle various type of conversion. Each module and/or component may implement a different set of logics and/or algorithms (e.g., different 3D-to-2D and 2D-to-3D mapping functions) for converting between a specific pair of projection formats. For example, to convert between a CMP format and an OHP format, each CMP sample point may be mapped to a point on a sphere using via a 2D-to-3D mapping function 1002 that may be specifically designed for the CMP format. The point on the sphere may then be mapped to an OHP sample point using a 3D-to-2D mapping function 1004 specifically designed for the OHP format. To convert a video between the CMP format and an ISP format, a different 3D-to-2D mapping function 1006 designed for the ISP format may be used instead of the mapping function 1004. Having different components and/or logics for different types of conversions may increase the complexity of 360-degree video products and services.

Uniform geometry conversion may be used to cover multiple types of conversions such as the conversion between two multi-faced projection formats (e.g., CMP, OHP, ISP, etc.). Uniform geometry conversion may exploit the geometric relationship between a 3D point and its counterpart (e.g., which may be derived via projection) on a 2D projection plane (e.g., a 2D projection face). Examples will be provided herein to illustrate how uniform geometry conversion may be performed. 3D-to-2D mapping between a 3D point and a corresponding 2D point on a projection face is described first, followed by a description of 2D-to-3D mapping from a 2D point on the projection face back to the 3D space. Triangular projection faces (e.g., such as those used in OHP and ISP) are used in the examples, with the understanding that the techniques may also be applied to other types of projection faces (e.g., including arbitrarily shaped planar projection faces) and/or other projection formats.

Figure 11:
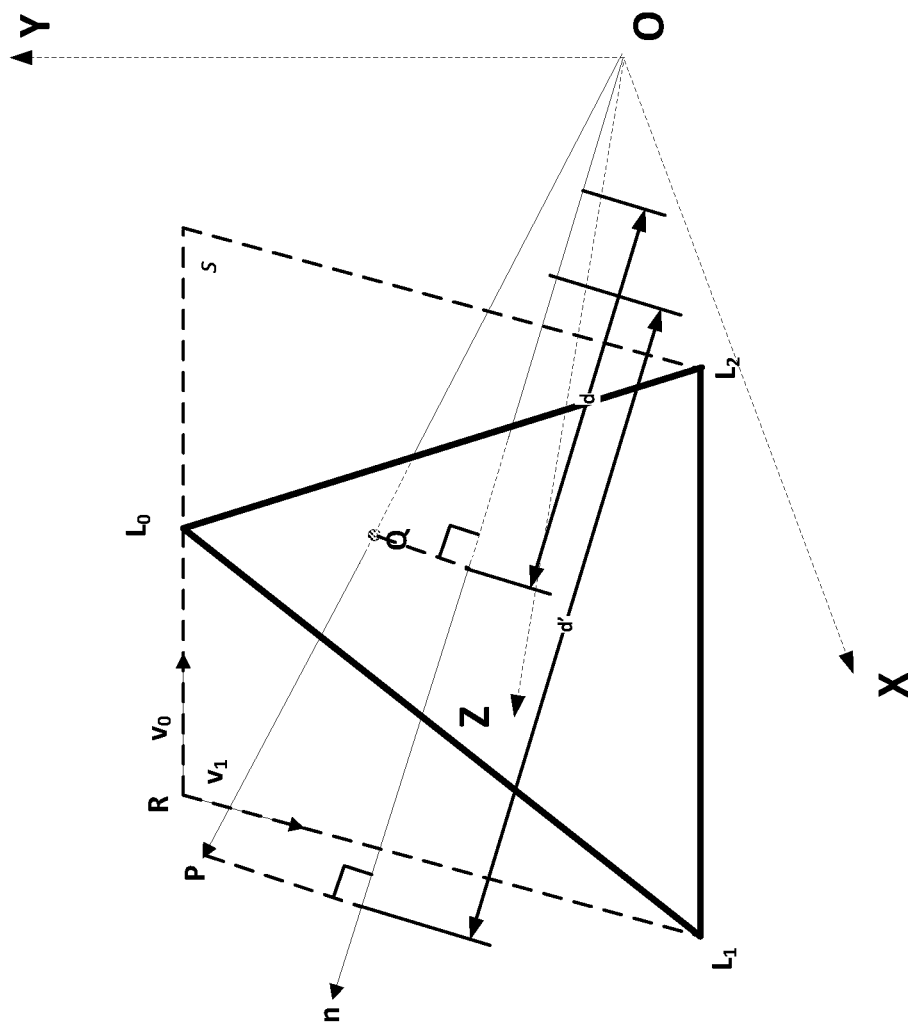
FIG. 11 is a diagram showing example geometry relationship between a 3D point and its corresponding point on a 2D projection plane.

FIG. 11 is a diagram illustrating an example geometric relationship between a 3D point P located on a sphere SP and a point Q on a 2D projection plane S (e.g., a projection face) onto which point P may be projected. The 3D point may be associated with a 360-degree video. For illustration purposes, assume that the 360-degree video comprises pictures or images captured by multiple cameras, which may be stitched onto the sphere SP. The sphere SP may be defined by a 3D coordinate system, with an origin at O and the three axes labeled X, Y and Z. The 2D projection plane S may be defined by a 2D coordinate system. The geometric characteristics of the 2D projection plane S may be dependent on the projection format (e.g., a first projection format). For instance, if the projection format is OHP or ISP, then a project face located on the 2D projection plane S may have a triangular shape.

The 2D projection plane S may be one of a plurality of projection planes associated with the concerned projection format. Each of the plurality of projection planes may be associated with a normal vector (e.g., a unit normal vector) that is perpendicular to the projection plane. The 2D projection plane S may be selected based the normal vectors associated with the plurality of projection planes and the location of the 3D point P. For example, the 2D projection plane S may be selected such that, among the normal vectors associated with the plurality of projection planes, the normal vector associated with the 2D projection plane is the closest to being parallel to a reference vector OP that starts from the origin O and ends at the 3D point P. In examples, the 2D projection plane S may be selected such that, among respective angles between the reference vector OP and the normal vectors associated with the plurality of projection planes, the angle between the reference vector OP and the normal vector associated with the 2D projection plane is the smallest.

Assume that the 2D coordinate system associated with the projection plane S have an origin at R. The location of R may be represented by corresponding X, Y, Z coordinates in the 3D coordinate system that defines the sphere SP and the 3D point P. As shown herein, R may be used as a reference point in the mapping between a 3D point and a 2D point. Assuming that the sphere SP is a unit sphere, the dimensions of a triangular projection face in the projection face S may fall within a range [0, 2] in the horizontal direction and a range [0, √3] in the vertical direction. Let $V_0$ and $V_1$ be two unit vectors originating from R and extending (e.g., pointing to) respectively in the horizontal and vertical directions of the projection plane S, the projection point Q of the 3D point P on the projection plane can be derived as $$Q = P\frac{d}{d'} \qquad \text{Eq. 13}$$

where d' and d may represent orthogonal projections of the 3D points P and Q on the normal vector n associated with the projection plane S, as illustrated below.

$$d = P \cdot n \qquad \text{Eq. 14}$$

$$d' = Q \cdot n \qquad \text{Eq. 15}$$

"·" may represent the dot product of two 3D points. Q may be the intersection point of the reference vector OP and the projection plane S. Since points R and Q belong to the same plane S that is perpendicular to the normal vector n, the orthogonal projections of points R and Q onto n may be equal, as illustrated below.

$$d = Q \cdot n = R \cdot n \qquad \text{Eq. 16}$$

Equations (14) and (16) may be substituted into Equation (13) to derive Q as $$Q = P\frac{R \cdot n}{P \cdot n} \qquad \text{Eq. 17}$$

The 2D coordinates of Q on the projection plane S, (u,v), may be calculated by projecting a projection vector associated with Q onto the unit vectors $V_0$ and $V_1$. The projection vector may start from an origin of the 2D coordinate system such as R and end at the projection point Q. The calculation may be performed as follows:

$$u = W(Q \cdot V_0)/2 \qquad \text{Eq. 18}$$

$$v = H(Q \cdot V_1)\sqrt{3} \qquad \text{Eq. 19}$$

where W and H may be the width and height, respectively, of a 2D image projected on the projection plane S and where the projection point Q may correspond to a pixel in the 2D image.

Equations (13) to (19) may be used to map a 3D point associated with a 360-degree video to 2D point on a projection plane (e.g., referred to herein as 3D-to-2D mapping). On the other hand, given a 2D point (u,v) on a projection plane (e.g., which may be associated with a second projection format), the 3D coordinates of the projection point Q associated with the 3D point P may be determined utilizing the geometry shown in FIG. 11. This operation may be referred to as 2D-to-3D mapping, and the determination may be performed as illustrated below.

$$Q = R + uV_0 + vV_1 \qquad \text{Eq. 20}$$

R may represent a reference point in a 2D projection plane associated with the second projection format. For example, R may be the origin point of a 2D coordinate system that defines the projection plane. $V_0$ and $V_1$ may respectively represent a horizontal vector originating from the reference point R and extending in a horizontal direction of the projection plane, and a vertical vector originating from the reference point R and extending in a vertical direction of the projection plane. The projection plane may be selected from a plurality of projection planes associated with the second projection format using similar techniques as described in association with Equations 13-19.

The parameters used in Equations 13-20 may be determined (e.g., received via signaling) and/or stored for one or more projection formats (e.g., CMP, ISP, OHP, etc.). These parameters may include, for each projection plane associated with a concerned projection format, a reference point (e.g., an origin point) of a 2D coordinate system defining the projection plane, a horizontal vector originating from the reference point and extending in a horizontal direction of the projection plane, a vertical vector originating from the reference point and extending in a vertical direction of the projection plane, and/or the like. During 3D-to-2D or 2D-to-3D mapping, the relevant projection format and projection plane may be determined (e.g., based a normal vector associated with the projection plane), and the parameters associated with the projection plane may be used in the mapping operation(s), e.g., according to Equations 13-20.

Without loss of generality, a conversion between OHP and ERP is described herein as an example. To determine an ERP sample point (ue, ve) that corresponds to an OHP sample point (uo, vo), one or more of the following operations may be performed. Using the sample point (uo, vo), the coordinates of a point Q in the 3D space may be calculated according to the 2D-to-3D mapping relationship shown in Eq. 20 (e.g., using parameters associated with the OHP projection format). A 3D point Q_s (e.g., the coordinates ($\varphi$, $\theta$) of Q_s) on a sphere (e.g., a unit sphere) may be determined based on point Q and in accordance with Eq. 3 to Eq. 5. The sample point (ue, ve) in a corresponding ERP picture may then be obtained in accordance with Eq. 1 and Eq. 2.

To determine an OHP sample point (uo, vo) that corresponds to an ERP sample point (ue, ve), one or more of the following operations may be performed. Using the sample point (ue, ve), spherical coordinates ($\varphi$, $\theta$) of a point P_s that corresponds to the sample point (ue, ve) may be determined according to Eq. 1 and Eq. 2. The 3D coordinates of P_s may then be determined based on ($\varphi$, $\theta$), e.g., according to Eq. 3 to Eq. 5. Using the 3D coordinates of P_s, the sample point (uo, vo) in an OHP picture may be derived, e.g., according to the 3D-to-2D mapping relationships shown in Eq. 13 to Eq. 19 and using parameters associated with the OHP projection format.

Figure 12:
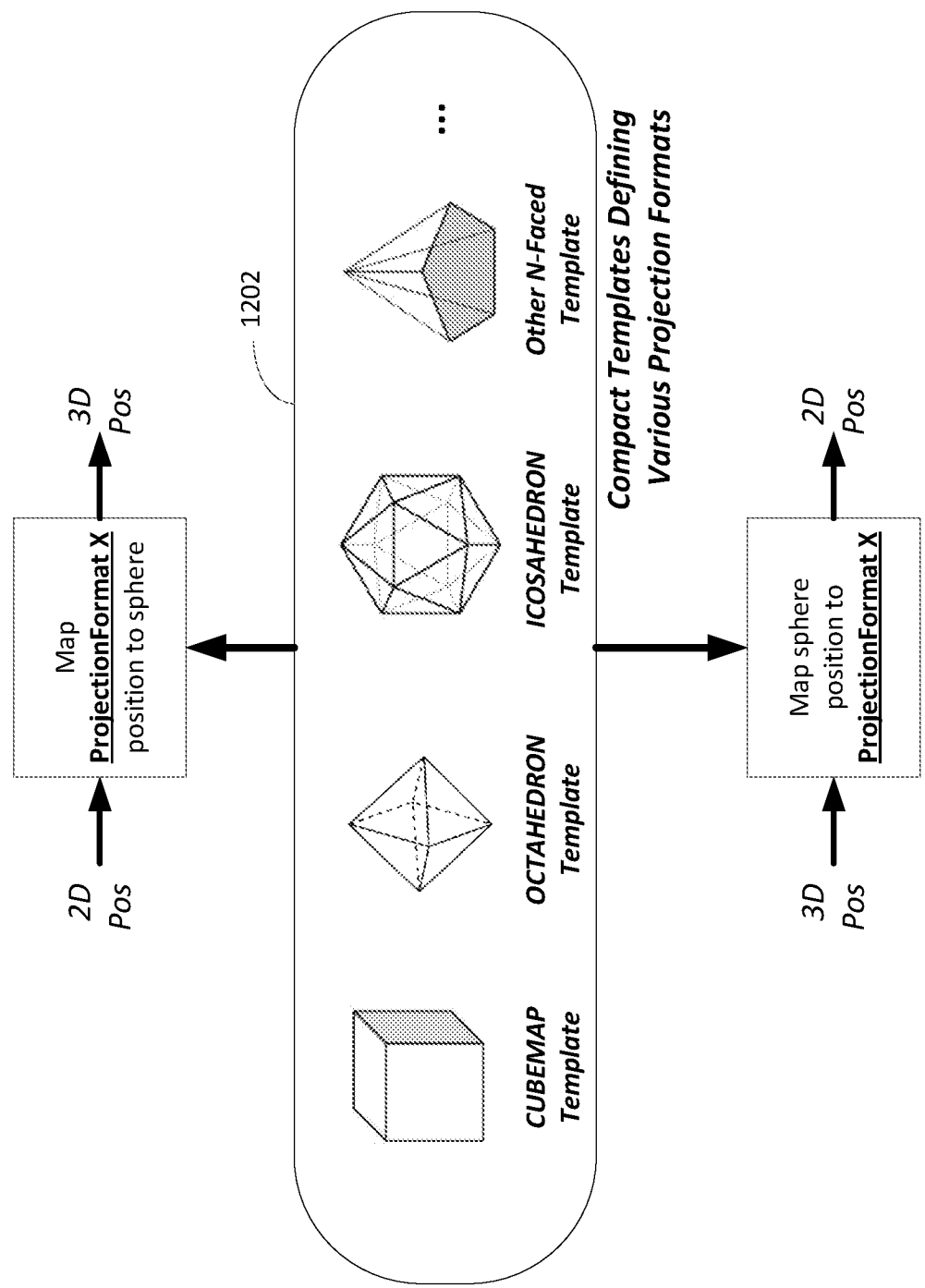
FIG. 12 is a diagram showing an example process for handling conversions for multiple different projection formats.

FIG. 12 shows an example of uniform geometry conversion. Multiple types of conversion among different projection formats may be performed including, for example, between CMP and OHP, between CMP and ISP, between another two types of multi-faced projection formats, and/or the like. 2D-to-3D and/or 3D-to-2D mapping operations associated with different types of conversions may be consolidated. For instance, as opposed to having multiple components (e.g., modules) each handling a different type of conversion (e.g., between a specific pair of projection formats), a uniform geometry conversion component may be configured to handle multiple types of conversions. One or more templates 1202 may be provided to assist with the uniform geometry conversion. The one or more templates 1202 may each capture the unique characteristics of a projection format. The one or more templates 1202 may each include parameters reflecting the unique characteristics of a projection format (e.g., such as the parameters used in Eq. 13-Eq.20). The one or more templates 1202 may each indicate how an image may be converted to and/or from the associated projection format.

To illustrate, a template may be created and/or stored in association with the Cubemap projection format. The template may describe (e.g., indicate) the characteristics of the Cubemap format and/or the steps that may be taken to convert an image from the Cubemap format to a different format (e.g., a target format such as the Octahedral format). The template may be used to convert from a 2D position to a spherical position. The template may be used to convert from a spherical position to a corresponding 2D position. In this way, 2D-to-3D mapping and/or 3D-to-2D mapping may be performed between any two projection formats (e.g., face-based projection formats) for which templates are available.

In examples, the template associated with a given projection format may specify the 3D coordinates of one or more projection faces (e.g., vertices of each of a plurality of planar projection faces) associated with the projection format. For example, as shown in FIG. 11, a template may include information indicative of the 3D coordinates of the three vertices of a triangle face (e.g., L0, L1 and L2). Using this template, a reference point R (e.g., which may be used as the origin of a 2D coordinate system defining the triangle face) and unit vectors $V_0$ (e.g., a horizontal vector) and $V_1$ (e.g., a vertical vector) of a corresponding 2D coordinate system may be determined, e.g., as illustrated in Equations (21)-(23). The results may then be used in a positional mapping operation such as the 2D-to-3D and/or 3D-to-2D mapping operation illustrated in Eq. 13-Eq. 20.

$$R = L_0 - (L_2 - L_1) \qquad \text{Eq. 21}$$

$$V_0 = (L_0 - R)/|L_0 - R| \qquad \text{Eq. 22}$$

$$V_1 = (L_1 - R)/|L_1 - R| \qquad \text{Eq. 23}$$

Figure 9:
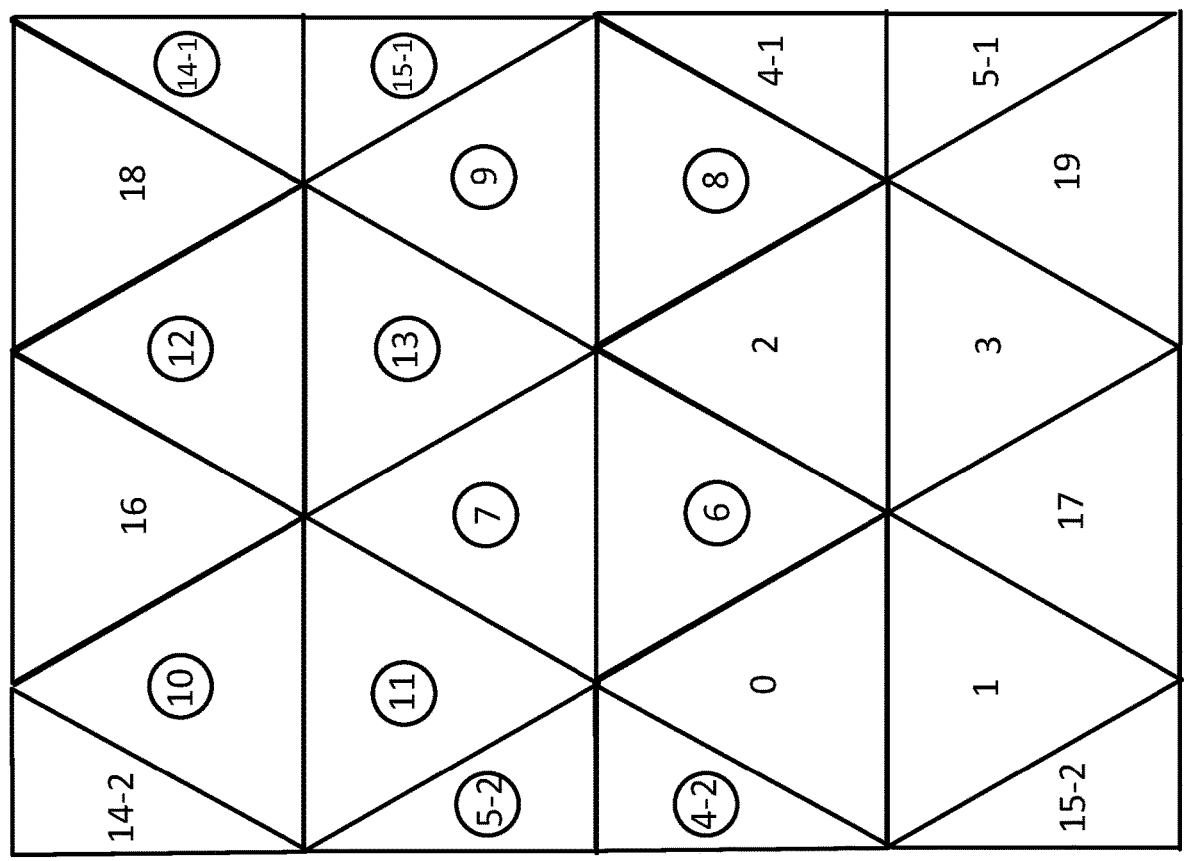
FIG. 9 is a diagram showing an example face arrangement for frame-packed icosahedron projection.

For certain 360-degree videos (e.g., compacted videos such as 3×2 CMP, COHP, or CISP), multiple projection faces may be packed together (e.g., into a single frame). As shown in FIG. 9, some projection faces may be flipped (e.g., horizontally and/or vertically) or rotated (e.g., by a certain degree). Such flipping may enhance the continuity between neighboring projection faces. In certain situations, such as when the projection faces associated with a selected projection format are not rectangular (e.g., triangle faces in the case of OHP or ISP), face boundaries may become rugged when continuous boundaries are transformed into discrete samples. If the discrete boundaries of non-rectangular projection faces are not well defined, holes (e.g., unfilled samples) may be produced during the coding of a 360-degree video (e.g., a compacted 360-degree video).

Figure 13:
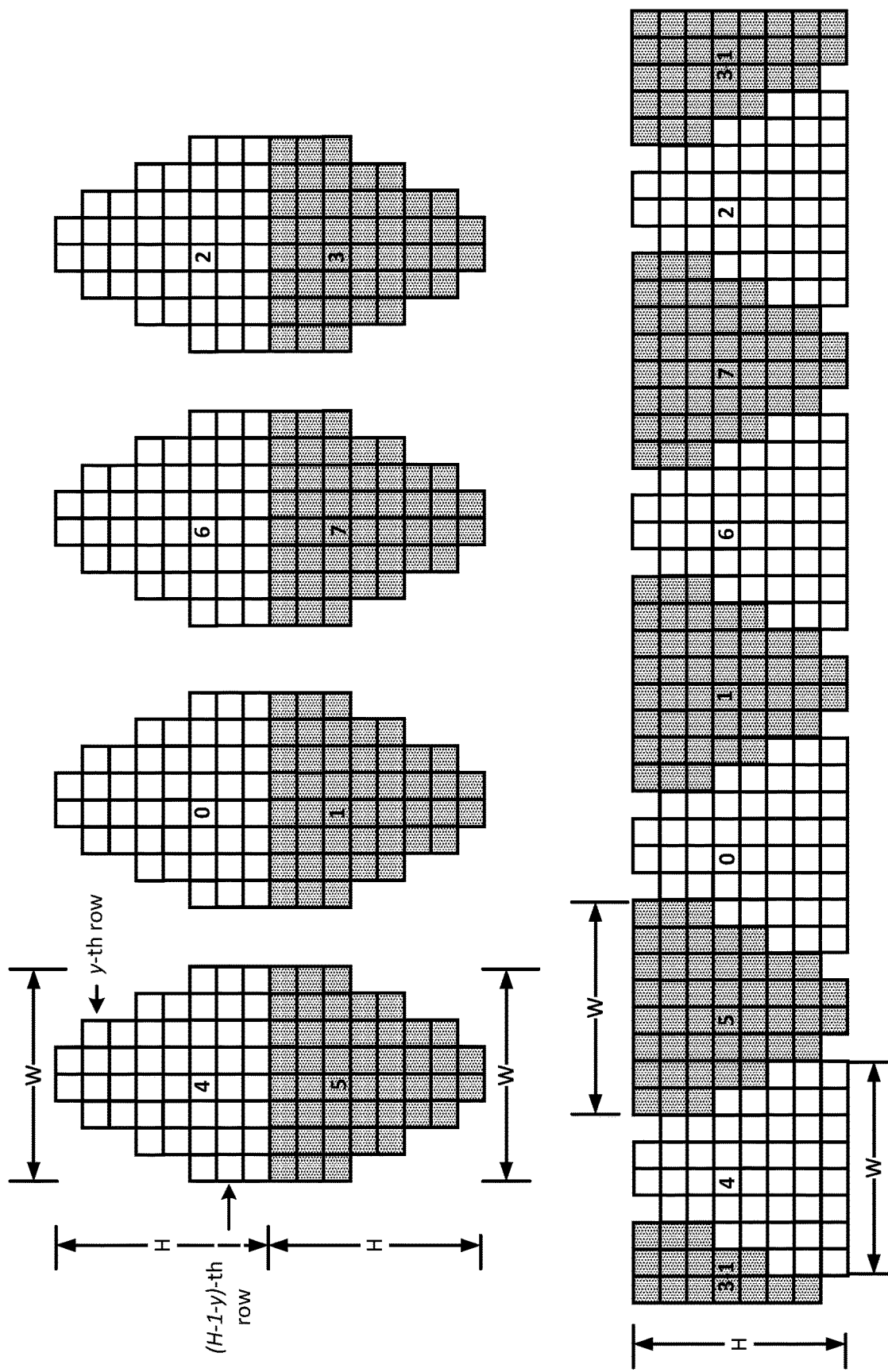
FIG. 13 shows example results of compacted octahedron projection with misaligned boundaries of triangle faces.

FIG. 13 shows example results of compacted octahedron projection with misaligned boundaries of triangle faces that illustrate the continuity issue described above. The boundaries of a triangle projection face may be defined as follows:

$$X_0 = \text{round}\left(((W-1) \gg 1) - \frac{y}{\sqrt{3}}\right) \quad \text{Eq. 24}$$

$$X_1 = W - 1 - X_0 \quad \text{Eq. 25}$$

where W may represent the width and the height of the triangle projection face, and $X_0$ and $X_1$ may represent the horizontal coordinates of two boundary samples in the y-th row of the triangle face. As such, when equations (24) and (25) are used to define the boundaries of each row of the projection face, the resulting projection face may have the shape of a triangle. The left boundary and the right boundary of the projection face may be vertically asymmetric. Boundary symmetry may not have been considered when determining the valid region of each projection face. The sum of the number of valid samples in a y-th row and a (H−1−y)-th row, where 0≤y≤H−1, may not be a constant number. As a result, the triangle boundaries of two neighboring faces (e.g., face 4 and face 5) may not be perfectly aligned, and the misalignment may lead to unfilled samples (e.g., referred to herein as holes) in the compacted 360-degree video (e.g., after frame packing).

Various filling techniques including linear interpolation may be used to fill the holes. Discretization may be applied to align the boundaries of neighboring projection faces, even if one or more of the faces are flipped or rotated. The symmetry conditions of the boundaries may be considered for this purpose. For example, at least two types of symmetry conditions, e.g., horizontal symmetry conditions and vertical symmetry conditions, may be considered when determining the locations of samples on the boundaries. A vertical symmetry condition may imply that the sum of the number of valid samples in two symmetrical rows of a projection face, e.g., such as the y-th row and the (H−1−y)-th row discussed above, may be constant. Such a vertical symmetry condition may indicate that the boundaries of two neighboring faces may be aligned without holes when one of the faces is rotated by 180-degree. A horizontal symmetry condition may imply that valid samples in each row of a face may be evenly distributed around a line that vertically divides the face into two equal pieces. Such a horizontal symmetry condition may indicate that the boundaries of two neighboring faces may be aligned without holes when one of the faces is flipped. For example, assuming W and H are the width and height of a projection face, the locations of two boundary samples, X_0 and X_1, may be determined for the y-th row of the projection face as follows.

$$d = \text{round}\left(y \times \frac{(W \gg 1) - (L \gg 1)}{H-1}\right) \quad \text{Eq. 26}$$

$$X_0 = (W \gg 1) - (L \gg 1) - d \quad \text{Eq. 27}$$

$$X_1 = W - 1 - X_0 \quad \text{Eq. 28}$$

where L may be the number of valid samples in the first row of the projection face (e.g., an even number).

Figure 14:
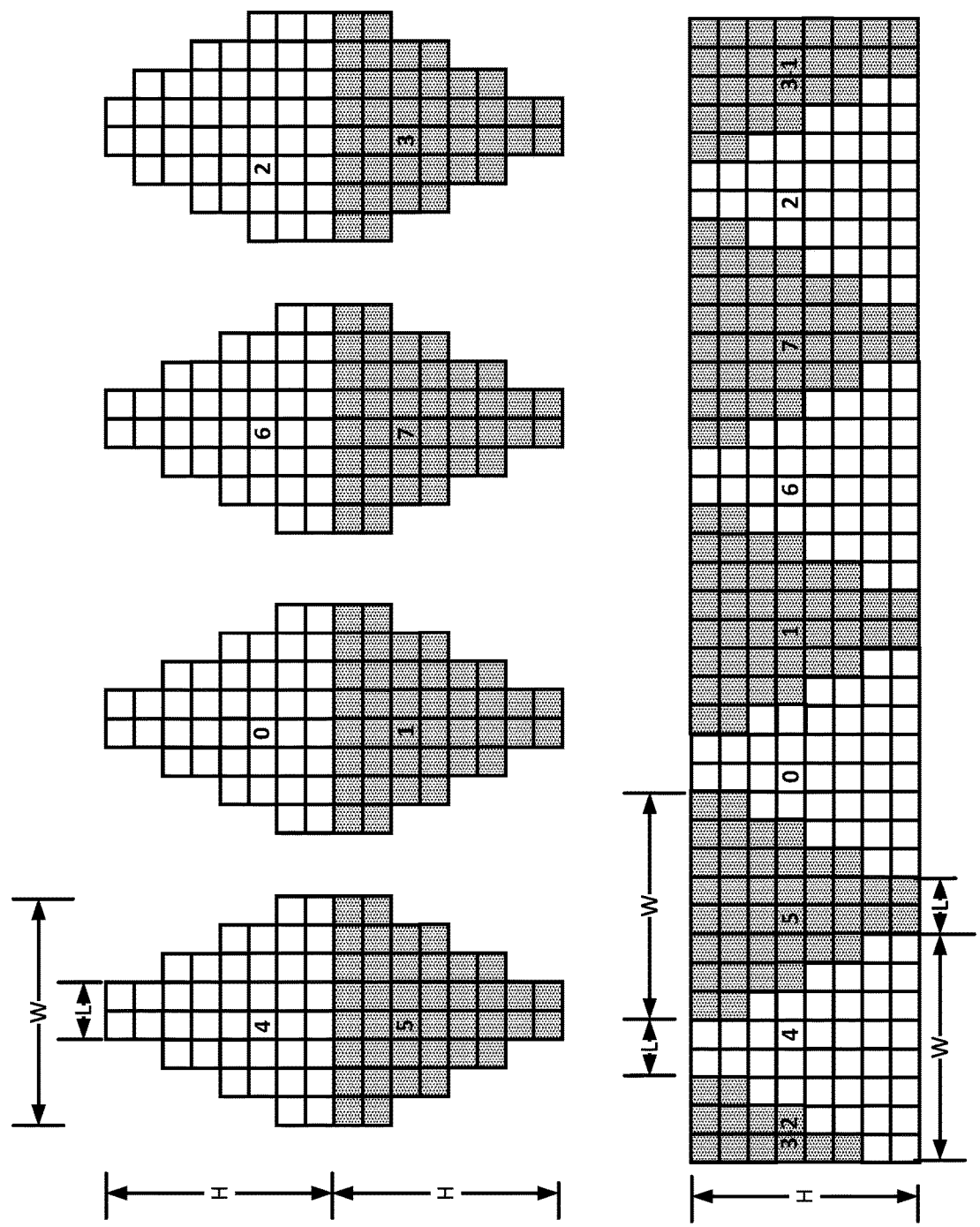
FIG. 14 shows example results of compacted octahedron projection using face boundary discretization to align the boundaries of neighboring triangle faces.

FIG. 14 is a diagram showing an example face boundary discretization technique for aligning the boundaries of neighboring projection faces. In this example, the number of valid samples, L, in the respective first rows of two projection faces is assumed to be two. Further, as in equations (26) to (28), it is assumed that the boundaries of the projection faces may be determined for the luma component. If an input 360-degree video includes both luma and chroma components (e.g., a non-4:0:0 video), frame packing may be applied separately to the luma component and the chroma component. To align the luma samples and the chroma samples in a compacted 360-degree video, boundary samples in the chroma plane may be determined based on boundary samples in the luma plane. For example, with 4:2:0 chroma format, the following relationship may exist between a chroma coordinate x_c and a luma coordinate x_y: x_y=2*x_c. When determining the boundary samples on the luma plane, corresponding boundary locations in the chroma plane may be checked such that they satisfy the horizontal and vertical symmetry conditions described herein. For example, the chroma components of a 360-degree video in 4:2:0 chroma format may be subsampled so that the horizontal and vertical resolutions of the chroma component may be half of those of the luma component. The locations of the boundary samples in a chroma face may be calculated based on corresponding luma boundary samples in accordance with equations (27) and (28), as illustrated below.

$$X_0^c = (W \gg 2) - (L \gg 2) - (d \gg 1) \quad \text{Eq. 29}$$

$$X_1^c = (W \gg 1) - 1 - X_0^c \quad \text{Eq. 30}$$

Equations (29) and (30) may show that one example way to make the boundary samples in a chroma face horizontally and vertically symmetric is to assign L, which may represent the number of valid samples in the first row of the chroma face, a value that is a multiple of 4 (e.g., L=4M where M may be an integer). d may be a value that is a multiple of 2. Using this approach, equation (26) may become the following for at least 4:2:0 videos.

$$d = 2 \times \text{round}\left(\left(y \times \frac{(W \gg 1) - ((4M) \gg 1)}{H-1}\right)/2\right) \quad \text{Eq. 31}$$

where 0≤M≤(W>>2).

The phase relationship between luma and chroma sampling grids may be preserved during geometry conversion and/or frame packing. For example, FIG. 15 is an example illustrating the sampling grid relationship between luma and chroma components (e.g., for the 4:2:0 chroma format). As shown, the chroma sampling grid may be aligned with the luma sampling grid in both the horizontal direction and the vertical direction. After geometry conversion and/or frame packing, the phase of the chroma sampling grid relative to the luma sampling grid may or may not remain the same. In certain 360-degree video processing frameworks (e.g., such as the example shown in FIG. 6), chroma subsampling may be performed at the geometry conversion stage (e.g., at least for non-4:4:4 videos) to maintain the chroma sampling phase relative to the luma sampling phase before and after the conversion. When certain faces are flipped (e.g., vertically flipped) before being packed into a single frame, as shown in the ISP example of FIG. 9, the relative sampling phase between the luma and chroma components may be changed.

Figure 16:
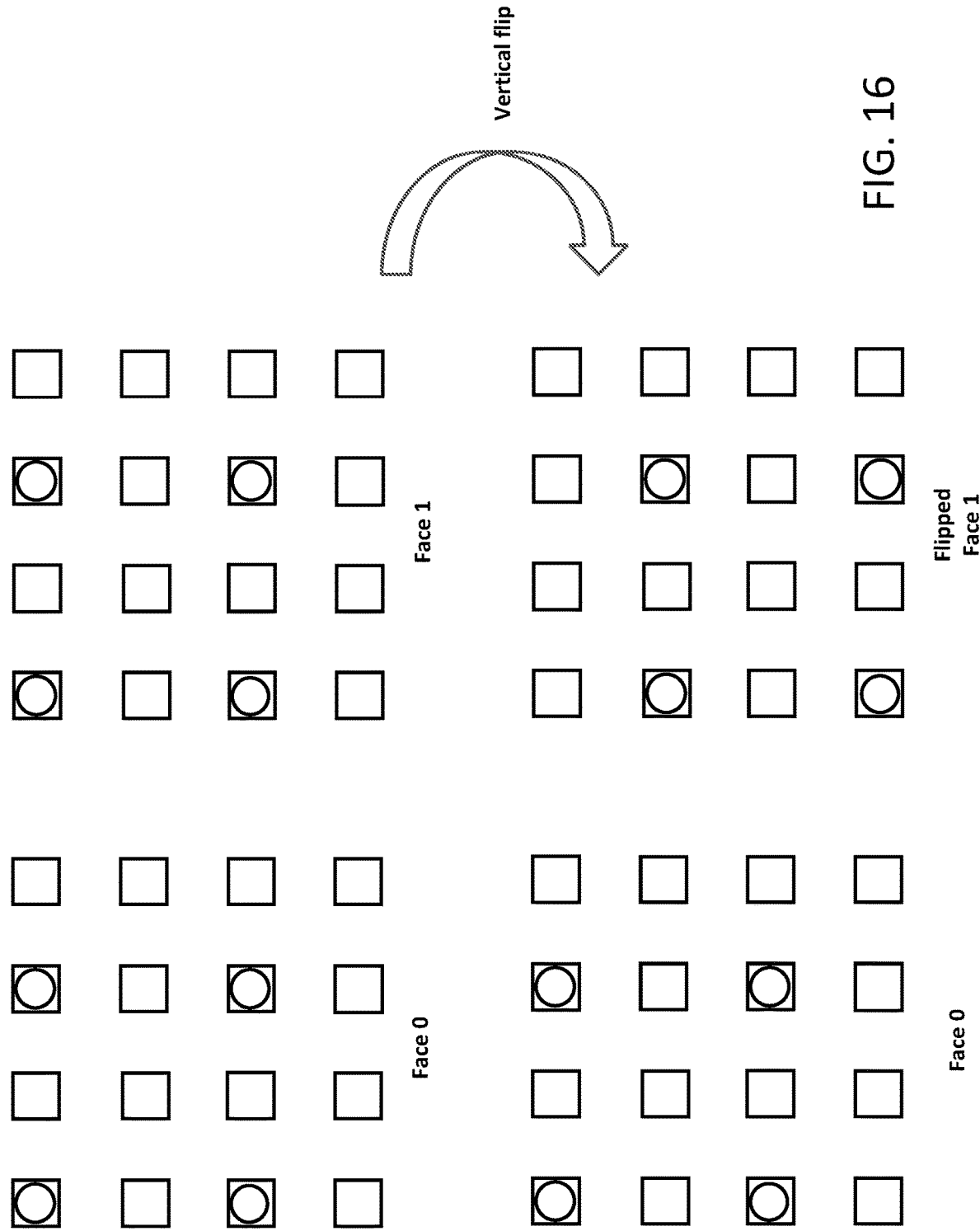
FIG. 16 is a diagram showing an example misaligned 4:2:0 chroma sampling grid due to vertical face flipping.

FIG. 16 is a diagram showing an example misaligned 4:2:0 chroma sampling grid due to vertical face flipping.

Figure 17:
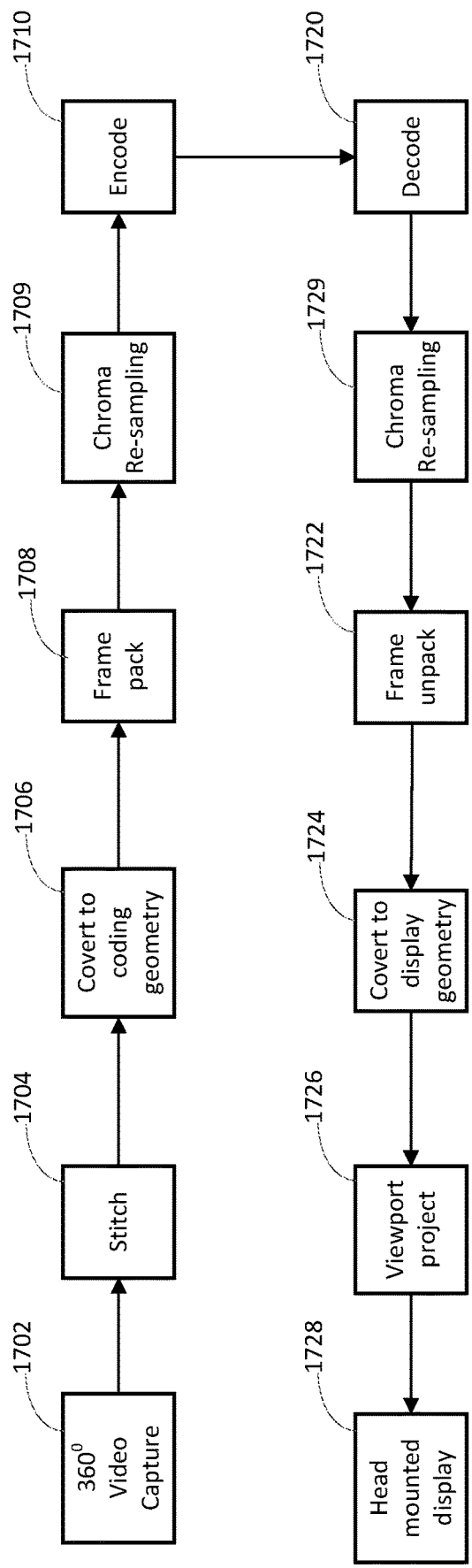
FIG. 17 is a diagram showing an example workflow of a 360-degree video system with chroma re-sampling.

Chroma re-sampling may be applied by a 360-degree video system to preserve the relative phase relationship between luma and chroma components of 360-degree videos (e.g., compacted 360-degree videos). FIG. 17 is an example flowchart illustrating 360-degree video processing in which chroma re-sampling may be performed, e.g., at 1707 and 1729, after frame packing and frame unpacking. At each of those chroma re-sampling stages, chroma samples of flipped and/or rotated faces may be resampled so that misalignment of chroma and luma samples may be corrected.

Using the 4:2:0 chroma sampling grid of FIG. 15 as an example, the luma and chroma sampling grids in each of two neighboring faces, Face 0 and Face 1, may be aligned in both the horizontal direction and the vertical direction before a flipping operation is performed. A face (e.g., Face 1) may then be vertically flipped during frame packing, shifting the phase of one or more samples in the flipped face (e.g., Face 1). Chroma re-sampling may be applied to adjust one or more chroma sampling positions of the flipped face so that those chroma sampling positions may remain aligned with their counterparts in the neighboring face (e.g., before encoding). An interpolation filter (e.g., such as one used in HEVC motion compensation at phase ½) may be used to generate the chroma samples at the aligned sampling positions of the flipped face.

Figure 18:
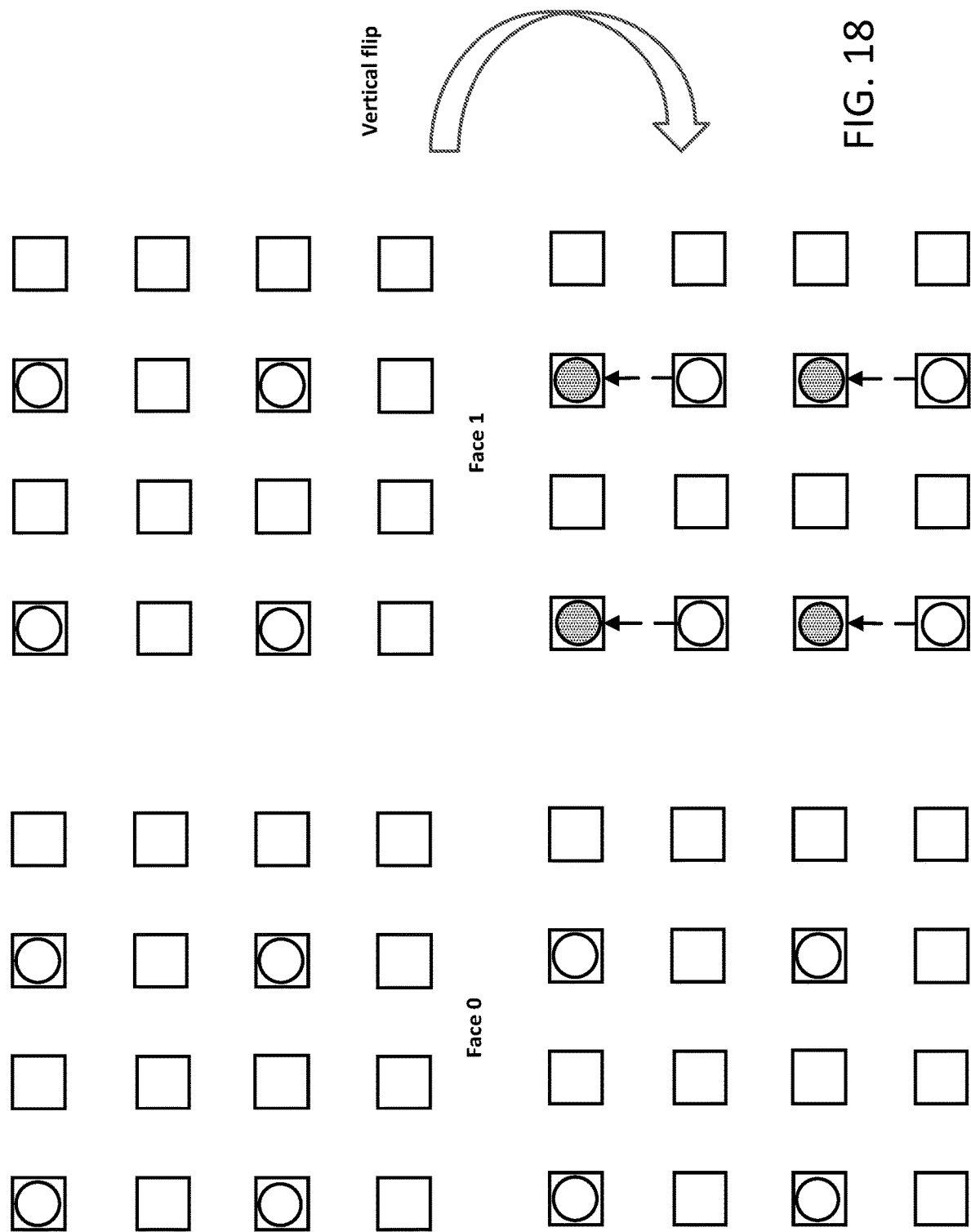
FIG. 18 is a diagram showing an example of chroma re-sampling.

FIG. 18 is a diagram showing an example chroma re-sampling technique. Squares in the figure may represent luma samples, while solid circles and pattern circles may respectively indicate original chroma samples and re-sampled chroma samples. Using the 4:2:0 chroma format as an example, there may be four types of chroma sampling grid placements relative to the luma sampling grid. These placements may be defined (e.g., in HEVC and H.264/AVC) as chroma sample location types, as illustrated in Table 1.

TABLE 1

Example chroma sample location type definition

| Chroma sample location type | Vertical phase shift relative to luma sample location | Horizontal phase shift relative to luma sample location |
| --- | --- | --- |
| 0 | 0.5 | 0 |
| 1 | 0.5 | 0.5 |
| 2 | 0 | 0 |
| 3 | 0 | 0.5 |

The chroma re-sampling techniques described herein may be applied to one or more directions (e.g., horizontal, vertical, or both) in which chroma sampling position may be changed during frame packing. The direction in which chroma re-sampling may be applied can be determined based on the original chroma sampling grid of one face and the direction in which the face is flipped. For example, if a face is vertically flipped, vertical chroma re-sampling (e.g., only vertical chroma-sampling) may be applied. This may be because a vertical flipping operation may not change the horizontal sampling positions of the chroma components. If a face is horizontally flipped, then horizontal re-sampling (e.g., only horizontal re-sampling) may be considered. This may be because a horizontal flipping operation may not change the vertical sampling positions of the chroma components. If a chroma sample location type is 0 or 1, vertical chroma re-sampling may be skipped in certain cases including, for example, when a face has been vertically flipped, resulting in the chroma samples being symmetric in the vertical direction. If a chroma sample location type is 1 or 3, horizontal chroma re-sampling may be skipped in certain cases including, for example, when a face has been horizontal flipped, resulting the chroma samples being symmetric in the horizontal direction.

Table 2 may summarize various example chroma re-sampling techniques when a face is flipped horizontally or vertically. It should be noted that although the chroma re-sampling techniques in Table 2 are described in the context of face flipping, those techniques may be extended to other face operations such as face rotations.

TABLE 2

Example chroma re-sampling techniques

| Chroma sample location type | Horizontal flipping | Vertical flipping |
| --- | --- | --- |
| 0 | Horizontal chroma re-sampling | No chroma re-sampling |
| 1 | No chroma re-sampling | No chroma re-sampling |
| 2 | Horizontal chroma re-sampling | Vertical chroma re-samling |
| 3 | No chroma re-sampling | Vertical chroma re-sampling |

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for processing a 360-degree video, the method comprising:
obtaining a frame-packed picture associated with the 360-degree video, the frame-packed picture comprising a projection face corresponding to a two-dimensional projection of the 360-degree video, the projection face comprising a luma component and a chroma component;

determining that the projection face has been flipped or rotated from an original orientation;

resampling the chroma component of the projection face so that a sampling phase relationship existed between the luma and chroma components before the flipping or rotating is preserved after the resampling; and processing the frame-packed picture based on the resampled chroma component and the luma component.

2. The method of claim 1, wherein determining that the projection face has been flipped or rotated from the original orientation comprises determining that the projection face has been flipped vertically or horizontally from the original orientation.

3. The method of claim 1, wherein resampling the chroma component of the projection face comprises:

identifying a direction in which the projection face has been flipped or rotated; and adjusting a phase of the chroma component based on the direction in which the projection face has been flipped or rotated.

4. The method of claim 1, wherein resampling the chroma component of the projection face comprises:

determining a phase shift of a chroma sample location relative to a corresponding luma sample location;

determining a direction in which the projection face has been flipped or rotated; and skipping the resampling of the chroma component in a horizontal direction or a vertical direction based on the phase shift of the chroma sample location relative to the corresponding luma sample location and the direction in which the projection face has been flipped or rotated.

5. The method of claim 4, wherein, in response to determining that a vertical phase shift of the chroma sample location relative to the corresponding luma sample location is approximately 0.5 and that the projection face has been flipped vertically, the resampling of the chroma component is skipped in the vertical direction, and wherein, in response to determining that a horizontal phase shift of the chroma sample location relative to the corresponding luma sample location is approximately 0.5 and that the projection face has been flipped horizontally, the resampling of the chroma component is skipped in the horizontal direction.

6. The method of claim 4, wherein skipping the resampling of the chroma component in the horizontal direction or the vertical direction based on the phase shift of the chroma sample location relative to the corresponding luma sample location and the direction in which the projection face has been flipped or rotated comprises:

maintaining a phase of the chroma component in the horizontal direction or the vertical direction based on the phase shift of the chroma sample location relative to the corresponding luma sample location and the direction in which the projection face has been flipped or rotated.

7. The method of claim 1, wherein determining that the projection face has been flipped or rotated from the original orientation comprises determining that the projection face has been rotated by a number of degrees from the original orientation.

8. The method of claim 1, wherein the chroma component is in a 4:2:0 chroma format.

9. The method of claim 1, wherein the projection face is derived using icosahedron projection.

10. The method of claim 1, wherein resampling the chroma component of the projection face comprises using an interpolation filter to generate chroma samples at respective sampling positions of the projection face so that the chroma samples align with corresponding luma samples at the sampling positions.

11. A video processing device, comprising:

a processor configured to:

obtain a frame-packed picture associated with a 360-degree video, the frame-packed picture comprising a projection face corresponding to a two-dimensional projection of the 360-degree video, the projection face comprising a luma component and a chroma component;

determine that the projection face has been flipped or rotated from an original orientation;

resample the chroma component of the projection face so that a sampling phase relationship existed between the luma and chroma components before the flipping or rotating is preserved after the resampling; and process the frame-packed picture based on the resampled chroma component and the luma component.

12. The video processing device of claim 11, wherein the processor being configured to determine that the projection face has been flipped or rotated from the original orientation comprises the processor being configured to determine that the projection face has been flipped vertically or horizontally from the original orientation.

13. The video processing device of claim 11, wherein the processor being configured to resample the chroma component of the projection face comprises the processor being configured to:

identify a direction in which the projection face has been flipped or rotated; and adjust a phase of the chroma component based on the direction in which the projection face has been flipped or rotated.

14. The video processing device of claim 11, wherein the processor being configured to resample the chroma component of the projection face comprises the processor being configured to:

determine a phase shift of a chroma sample location relative to a corresponding luma sample location;

determine a direction in which the projection face has been flipped or rotated; and skip the resampling of the chroma component in a horizontal direction or a vertical direction based on the phase shift of the chroma sample location relative to the corresponding luma sample location and the direction in which the projection face has been flipped or rotated.

15. The video processing device of claim 14, wherein the processor is configured to skip the resampling of the chroma component in the vertical direction in response to determining that a vertical phase shift of the chroma sample location relative to the corresponding luma sample location is approximately 0.5 and that the projection face has been flipped vertically, and wherein the processor is configured to skip the resampling of the chroma component in the horizontal direction in response to determining that a horizontal phase shift of the chroma sample location relative to the corresponding luma sample location is approximately 0.5 and that the projection face has been flipped horizontally.

16. The video processing device of claim 14, wherein the processor being configured to skip the resampling of the chroma component in the horizontal direction or the vertical direction based on the phase shift of the chroma sample location relative to the corresponding luma sample location and the direction in which the projection face has been flipped or rotated comprises the processor being configured to:

maintain a phase of the chroma component in the horizontal direction or the vertical direction based on the phase shift of the chroma sample location relative to the corresponding luma sample location and the direction in which the projection face has been flipped or rotated.

17. The video processing device of claim 11, wherein the processor being configured to determine that the projection face has been flipped or rotated from the original orientation comprises the processor being configured to determine that the projection face has been rotated by a number of degrees from the original orientation.

18. The video processing device of claim 11, wherein the chroma component is in a 4:2:0 chroma format.

19. The video processing device of claim 11, wherein the projection face is derived using icosahedron projection.

20. The video processing device of claim 11, wherein the processor being configured to resample the chroma component of the projection face comprises the processor being configured to use an interpolation filter to generate chroma samples at respective sampling positions of the projection face so that the chroma samples align with corresponding luma samples at the sampling positions.

* * * * *